(12) United States Patent
Moriki et al.

(10) Patent No.: US 11,379,814 B2
(45) Date of Patent: Jul. 5, 2022

(54) METHOD AND SYSTEM FOR SUPPORTING PROMOTION OF USE OF DIGITAL LOCAL CURRENCY

(71) Applicant: Hitachi, Ltd., Tokyo (JP)

(72) Inventors: Toshiomi Moriki, Tokyo (JP); Yuuichi Kurosawa, Tokyo (JP); Hiroki Satoh, Tokyo (JP); Miho Kobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 182 days.

(21) Appl. No.: 16/920,840

(22) Filed: Jul. 6, 2020

(65) Prior Publication Data

US 2021/0056530 A1 Feb. 25, 2021

(30) Foreign Application Priority Data

Aug. 20, 2019 (JP) .............................. JP2019-150383

(51) Int. Cl.
*G06Q 20/20* (2012.01)
*G06Q 20/06* (2012.01)
(Continued)

(52) U.S. Cl.
CPC ......... *G06Q 20/206* (2013.01); *G06F 3/0482* (2013.01); *G06F 3/04883* (2013.01);
(Continued)

(58) Field of Classification Search
CPC ............... G06Q 20/206; G06Q 20/065; G06Q 20/0855; G06Q 20/208; G06Q 20/209; G06Q 20/3276; G06Q 20/40145; G06V 40/1365; G06F 3/0482; G06F 3/04883; G06K 7/1417
See application file for complete search history.

(56) References Cited

U.S. PATENT DOCUMENTS 10,733,614 B2 * 8/2020 Sapoznik ................ H04L 67/20
2012/0240293 A1 * 9/2012 Tang ...................... C12N 9/2482
435/252.31
(Continued)

FOREIGN PATENT DOCUMENTS

JP 5436718 B1 3/2014
JP 2017-90989 A 5/2017

OTHER PUBLICATIONS

Certificate of Exception to Lack of Novelty submitted in corresponding Japanese Patent Application No. 2019-150383 filed on Sep. 17, 2019 with English translation.

*Primary Examiner* — A. Hunter Wilder
*Assistant Examiner* — Joseph M Mutschler
(74) *Attorney, Agent, or Firm* — Foley & Lardner LLP

(57) ABSTRACT

An application executed at a user terminal with a touch screen displays, on the touch screen, a UI in which a user-side UI for accepting a touch operation by a user and a store-side UI for accepting a touch operation by a staff member of a store are placed, as a settlement UI for settlement of a currency amount of a digital local currency. The application judges whether time during which the touch operation on the user-side UI and the touch operation on the store-side UI are simultaneously continued has reached a specified period of time or not. If the judgment result is true, the application displays a settlement completion notice on the touch screen.

8 Claims, 16 Drawing Sheets

(51) Int. Cl.
*G06Q 20/08* (2012.01)
*G06Q 20/40* (2012.01)
*G06Q 20/32* (2012.01)
*G06K 7/14* (2006.01)
*G06F 3/04883* (2022.01)
*G06F 3/0482* (2013.01)
*G06V 40/12* (2022.01)

(52) U.S. Cl.
CPC ......... *G06K 7/1417* (2013.01); *G06Q 20/065* (2013.01); *G06Q 20/0855* (2013.01); *G06Q 20/208* (2013.01); *G06Q 20/209* (2013.01); *G06Q 20/3276* (2013.01); *G06Q 20/40145* (2013.01); *G06V 40/1365* (2022.01)

(56) References Cited

U.S. PATENT DOCUMENTS

| | | | |
|---|---|---|---|
| 2013/0262161 A1 | 10/2013 | Matsuda | |
| 2015/0293622 A1* | 10/2015 | Han | H04W 12/06 345/174 |
| 2016/0004898 A1* | 1/2016 | Holz | G06F 21/32 345/173 |

* cited by examiner

FIG. 6

STORE TABLE
501

| STORE ID (601) | STORE NAME (602) | CONTACT (603) | DESCRIPTION (604) |
|---|---|---|---|
| 001 | STORE-A | xxx1@xx.com | ... |
| 002 | STORE-B | xxx2@xx.com | ... |
| ... | ... | ... | ... |

FIG. 7

USER TABLE
502

| USER ID (701) | USER NAME (702) | CONTACT (703) | BIRTH DATE (704) | REGISTRATION DATE (705) | VALID FLAG (706) |
|---|---|---|---|---|---|
| 001 | TARO HITACHI | yyy1@yy.com | 03/01/1970 | 04/01/2019 | 1 |
| ... | ... | ... | ... | ... | ... |

MENU TABLE
503

| STORE ID | SALES OBJECT ID | PAYMENT AMOUNT (TICKETS/POINTS) | BAR CODE DATA | IMAGE DATA |
|---|---|---|---|---|
| 001 | 1 | 1/150 | aabbxx.. | xxx.jpg |
| | 2 | 2/- | aabcxx.. | xxy.jpg |
| | ... | ... | ... | ... |
| ... | ... | ... | ... | ... |

801, 802, 803, 804, 805

STORE AUTHENTICATION TABLE
504

| STORE ID | AUTHENTICATION INFORMATION | |
|---|---|---|
| | FEATURE AMOUNT | STAMP SEAL |
| 001 | triangle, 3pt, ... | stamp001.svg |
| ... | ... | ... |

WALLET TABLE
505

| ID | TYPE | POINT BALANCE | TENTATIVELY RESERVED POINTS | TICKET BALANCE | TENTATIVELY RESERVED TICKETS |
|---|---|---|---|---|---|
| 001 | Store | 200,200 | 0 | 50 | 0 |
| 001 | User | 1,005 | 0 | 7 | 1 |
| ... | ... | ... | ... | ... | ... |

FIG. 11

TRANSACTION TABLE
506

| ID | TOKEN | PAYER | PAYEE | CURRENCY AMOUNT | STATUS |
|---|---|---|---|---|---|
| ... | ... | ... | ... | ... | ... |
| 0123 | xx... | 001/User | 001/Store | 1 ticket | TENTATIVELY RESERVED |
| 0124 | yy... | 002/User | 002/Store | 200 pt | COMPLETED |
| ... | ... | ... | ... | ... | ... |

METHOD AND SYSTEM FOR SUPPORTING PROMOTION OF USE OF DIGITAL LOCAL CURRENCY

CROSS-REFERENCE TO PRIOR APPLICATION

This application relates to and claims the benefit of priority from Japanese Patent Application number 2019-150383, filed on Aug. 20, 2019, the entire disclosure of which is incorporated herein by reference.

BACKGROUND

The present disclosure generally relates to computer technology for supporting promotion of the use of a digital local currency.

As a result of the advance of economic globalization and the development of distribution, many life consumer goods are produced in other countries and imported/exported across national borders. Today, a large number of consumers are purchasing products by searching for as inexpensive products as possible and preferably selecting large-scale chain stores and global mail-order business operators. Fund flows for small-scale local business operators (such as shops and restaurants) with unique characters have diminished and the small-scale local business operators are in danger of obsolescence.

A local currency is known as a method for distributing funds preferentially to the local business operators. It has been common to use a method of adopting some kind of substance like paper tickets as the local currency; however, recently it is considered favorable to adopt a digital local currency as a result of enrichment of settlement technology and value recording technology. An example of the enrichment of the settlement technology is the rapid spread of settlement with smartphone applications and two-dimensional bar codes. An example of the enrichment of the value recording technology is the spread of distributed ledger technology (typically, blockchain).

It is possible to adopt digital tickets as an example of the digital local currency. For example, technology disclosed in Reference 1 is known regarding handling of the digital tickets. Furthermore, for example, technology disclosed in Reference 2 is known as an electronic settlement system for promoting local circulation type transactions.

Reference 1: JP5436718
Reference 2: JP2017-90989

SUMMARY

In addition to luring of customers, the promotion of continuous purchasing behaviors is indispensable in order to energize the local economy by using the local currency. Specifically speaking, users in a local area (such as local residents) are required to prefer the use of stores (such as shops and restaurants) in the local area to the mail-order business operators and business operators outside the local area, that is, to promote the use of the local currency.

Furthermore, it is thought that local stores are of small-scale size and have poor investment capability with respect to equipment for the settlement using the digital local currency.

So, it is an object of the present disclosure for stores belonging to the local area to promote the use of the digital local currency without extensively investing in equipment for the settlement with the digital local currency.

An application executed at a user terminal with a touch screen displays, on the touch screen, a UI (User Interface) in which a user-side UI for accepting a touch operation by a user and a store-side UI for accepting a touch operation by a staff member of a store are placed, as a settlement UI for settlement of a currency amount of the digital local currency. The application judges whether time during which the touch operation on the user-side UI and the touch operation on the store-side UI are simultaneously continued has reached a specified period of time or not. If the judgment result is true, the application displays a settlement completion notice on the touch screen.

The stores belonging to the local area can promote the use of the digital local currency without extensively investing in equipment for the settlement with the digital local currency.

BRIEF DESCRIPTION OF THE DRAWINGS

FIG. 6 illustrates a configuration example of a store table;

FIG. 7 illustrates a configuration example of a user table;

FIG. 10 illustrates a configuration example of a wallet table;

FIG. 11 illustrates a configuration example of a transaction table;

DESCRIPTION OF EMBODIMENTS

Figure 1:
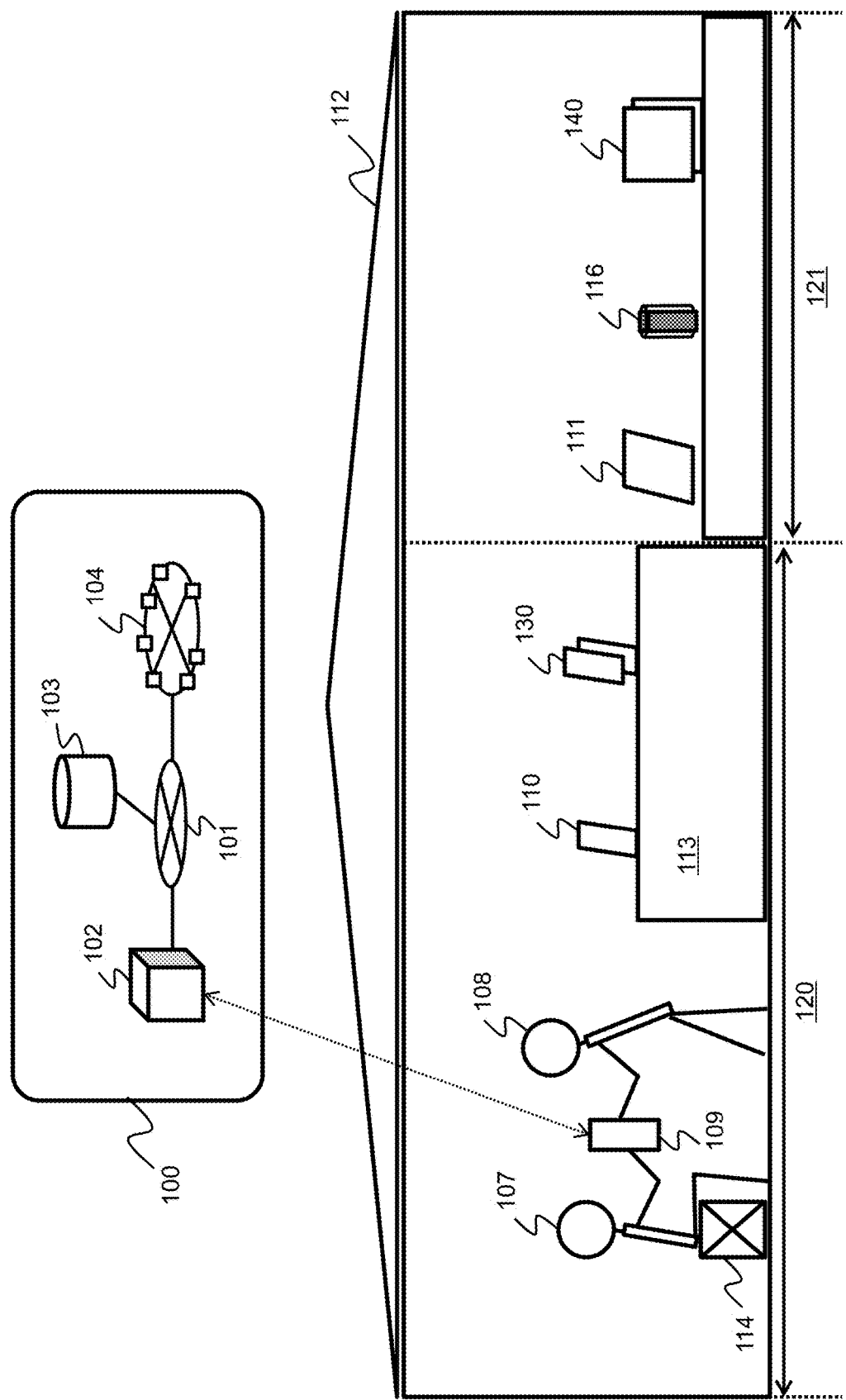
FIG. 1 illustrates a configuration example of the entire system according to an embodiment of the present disclosure.

In the following description, an "interface apparatus" may be one or more interface devices. The one or more interface devices may be at least one of the following:

One or more I/O (Input/Output) interface devices. The I/O (Input/Output) interface device is an interface device for at least one of an I/O device and a remote display computer. The I/O interface device for the display computer may be a communication interface device. At least one I/O device may be a user interface device, for example, either one of an input device such as a keyboard and a pointing device and an output device such as a display device.

One or more communication interface devices. The one or more communication interface devices may be one or more communication interface devices of the same type (such as one or more NIC's [Network Interface Cards]) or two or more communication interface devices of different types (such as an NIC and an HBA [Host Bus Adapter]).

Moreover, in the following description, a "memory" is one or more memory devices and may typically be a main storage device(s). At least one memory device of the memory may be a volatile memory device or a nonvolatile memory device.

Furthermore, in the following description, a "permanent storage apparatus" is one or more permanent storage devices. The permanent storage device(s) is typically a nonvolatile storage device(s) (such as an auxiliary storage device(s)) and is specifically, for example, an HDD(s) (Hard Disk Drive(s)) or an SSD(s) (Solid State Drive(s)).

Furthermore, in the following description, a "storage apparatus" may be at least a memory among the memory and the permanent storage apparatus.

Furthermore, in the following description, a "processor" is one or more processor devices. The at least one processor device is typically a microprocessor device like a CPU (Central Processing Unit), but may be a processor device of a different type like a GPU (Graphics Processing Unit). The at least one processor device may be of a single-core type or a multi-core type. The at least one processor device may be a processor core. The at least one processor device may be a processor device in a broad sense such as a hardware circuit for executing part or whole of processing (such as an FPGA [Field-Programmable Gate Array] or an ASIC [Application Specific Integrated Circuit]).

Furthermore, in the following description, information which is obtained as output in response to input may be sometimes described by an expression like "xxx table"; however, such information may be data of any type of whatever structure (for example, either structured data or unstructured data) or may be a learning model like a neural network which outputs in response to input. Therefore, the "xxx table" can be expressed as "xxx information." Furthermore, in the following description, the structure of each table is one example and one table may be divided into two or more tables or all or some of two or more tables may be one table.

Furthermore, in the following description, processing may sometimes described by referring to a "program" as a subject; however, the program is executed by a processor and thereby performs defined processing by using, for example, a storage apparatus and/or an interface apparatus as appropriate, so that the subject of the processing may be the processor (or a device like a controller having that processor). The program may be installed from a program source into a device like a computer. The program source may be, for example, a storage medium (such as a non-transitory storage medium) which can be read by a program distribution server or a computer. Furthermore, in the following description, two or more programs may be implemented as one program or one program may be implemented as two or more programs.

Furthermore, in the following description, when an explanation is provided without distinguishing between elements of the same type, a common part in reference numerals may be used; and when an explanation is provided by distinguishing between the elements of the same type, the reference numerals may be sometimes used. For example, when menus are not distinguished, they are referred to as a "menu 140"; and when the menus are distinguished, they may be sometimes referred to as a "menu 140*a*" and a "menu 140*b*."

Furthermore, a "digital local currency" is a currency which is issued by a specified issuer and ca be used only in a specified area (such as a city, a town, or a village). The digital local currency may be hereinafter sometimes simply referred to as a "local currency."

Furthermore, a "user" is a person who can purchase a purchase object(s) (typically, a product(s) or a service(s)) with the digital local currency. The user may be also called a consumer or a buyer.

Furthermore, a "store" is a person who sells a sales object(s) (typically, a product(s) or a service(s)). The store may be also called a business operator or a supplier.

Furthermore, a "store staff member" is a person who belongs to the store. The store staff member is typically an employee; however, the store staff member is not limited to the employee and may be, for example, an owner.

An embodiment of the present disclosure will be explained with reference to the drawings. Incidentally, in the following description, both two types of currencies that are "tickets" and "points" can be used as the digital local currency. A "currency amount" is a ticket amount (the number of tickets) or a point amount (the number of points). Regarding types of the digital local currency, types other than at least one type of the "tickets" and the "points" (for example "coins") may be adopted. Furthermore, in the following embodiment, it may be possible or impossible to convert the ticket amount into the point amount and convert the point amount into the ticket amount.

FIG. 1 illustrates a configuration example of the entire system according to an embodiment of the present disclosure.

In this embodiment, face-to-face settlement between a user and a store staff member is adopted in order to energize the local economy through promotion of the use of the digital local currency. The use of the digital local currency is promoted by contriving the face-to-face settlement.

A store 112 generally has a customer serving area 120 for a store staff member 108 to serve a customer(s) and a private work area 121 separated from the customer serving area. The customer serving area 120 and the work area 121 are separated from each other by, for example, a store counter 113. Regarding industry types of the store 112, mainly the industry types which provide face-to-face services to users (consumers) such as the sale of foods and drinks and the sale of general merchandise are assumed; however, the industry types of the store 112 are not limited to the above-described examples as long as it is possible to adopt the face-to-face settlement.

The payment of a payment amount with the local currency in exchange for an object purchased by a user 107 and charging to allocate the local currency to a mobile terminal 109 are performed inside the store 112 through interactions between the user 107 and a store staff member 108 via the mobile terminal 109. In this embodiment, the "payment" and the "charging" will be collectively referred to as "settlement."

The mobile terminal 109 is an example of the user terminal carried by the user and has at least a touch screen. The mobile terminal 109 is, for example, a smartphone retained by the user 107. The mobile terminal 109 communicates with an IT system 100. Communications between the mobile terminal 109 and the IT system 100 may be performed via a communication network such as a mobile line network or a public wireless LAN (Local Area Network). The IT system 100 is, for example, a system including a Web/AP (Application) server 102, a settlement DB (database) 103, and a blockchain NW (network) 104. The Web/AP server 102, the settlement DB 103, and the blockchain NW 104 are connected to an internal network 101 of the IT system 100. The Web/AP server 102 is an example of the server and is a Web server or an AP server.

The IT system 100 may possibly be, for example, a single data center (DC) or a system configured of a plurality of DC's; however, the configuration of the IT system 100 is not limited to such examples. For example, the blockchain NW 104 may not be included. The settlement DB 103 may be designed as a node belonging to the blockchain NW 104. At least one of the Web/AP server 102 and the settlement DB 103 may be one or more physical computers or a system implemented on a system having a plurality of types of computer resources (for example, the structure of cloud computing).

The store 112 is provided with a store information card 110, a charge card 130, a store tablet 111, a store stamp 116, and a menu 140. The store information card 110 and the charge card 130 are provided in the customer serving area 120 so that the user can pick them up for the purpose of settlement. The charge card 130 may be prepared for each different currency amount. A customer seat(s) 114 is also provided in the customer serving area 120. The store tablet 111, the store stamp 116, and the menu 140 are provided in the work area 121 and are carried by the store staff member 108 to the customer serving area 120 as necessary. Other types of an information processing terminal (such as a smartphone) including a touch screen may be adopted instead of the store tablet 111.

When performing the charging, the user 107 hands the charge card 130, which indicates a desired currency amount and which is placed in the customer serving area 120, to the store staff member 108. Then, the user 107 charges the desired amount to the mobile terminal 109 via the charge card 130 and the store tablet 111 in exchange for, for example, cash or electronic money. On the other hand, when making the payment, the user 107 has the mobile terminal 109 read a two-dimensional bar code printed on the store information card 110 in the customer serving area 120 or a two-dimensional bar code corresponding to a desired product on the menu 140. The store information card 110 is always provided in the customer serving area 120, for example, around a cash register (which is not illustrated in the drawing) of the store 112 as described above. On the other hand, the menu 140 is hand-carried by the store staff member 108 from the work area 121 to the customer seat 114 when the user 107 asks for a product or service such as food and drink.

This embodiment will be described below in detail.

Figure 2:
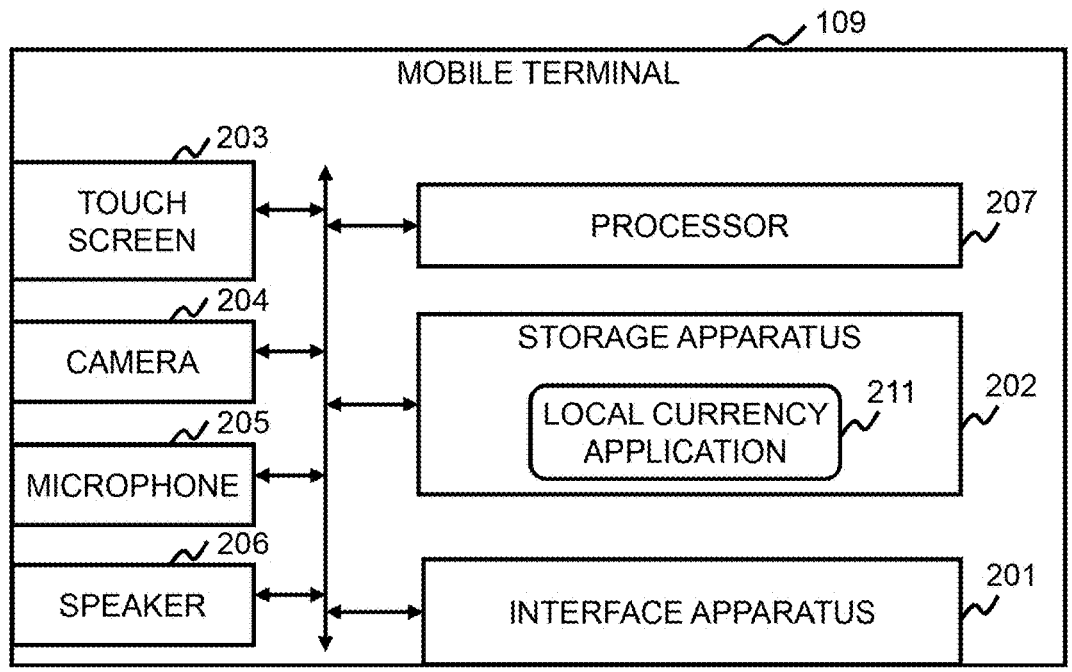
FIG. 2 illustrates a configuration example of a mobile terminal.

FIG. 2 illustrates a configuration example of the mobile terminal 109.

The mobile terminal 109 may typically be a smart device like a smartphone or tablet having a touch screen 203. The mobile terminal 109 includes an interface apparatus 201, a storage apparatus 202, a touch screen 203, a camera 204, a microphone 205, a speaker 206, and a processor 207 connected thereto. The storage apparatus 202 stores a local currency application 211 (an example of a first application program). The local currency application 211 is downloaded, for example, from a program distribution server through the interface apparatus 201 and is stored in the storage apparatus 202. The processor 207 reads the local currency application 211 from the storage apparatus 202 and executes that application 211. The local currency application 211 supports, for example, the face-to-face settlement.

Figure 3:
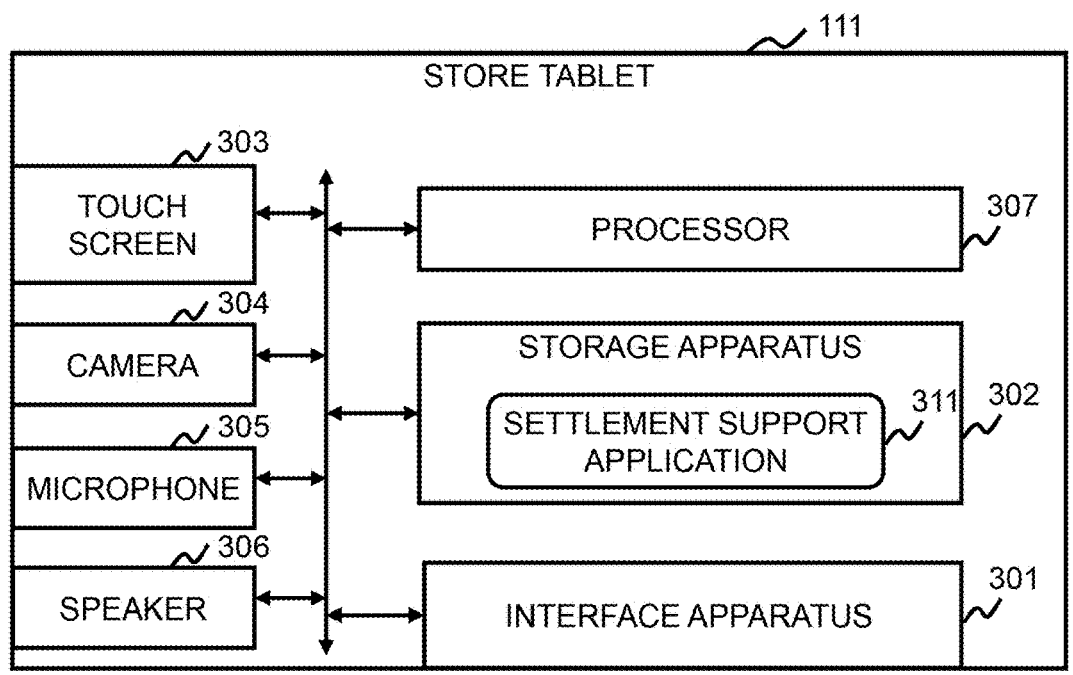
FIG. 3 illustrates a configuration example of a store tablet.

FIG. 3 illustrates a configuration example of the store tablet 111.

The store tablet 111 may typically be a smart device like a smartphone or tablet having a touch screen 303. The store tablet 111 includes an interface apparatus 301, a storage apparatus 302, a touch screen 303, a camera 304, a microphone 305, a speaker 306, and a processor 307 connected thereto. The storage apparatus 302 stores a settlement support application 311 (an example of a second application program). The settlement support application 311 is downloaded, for example, from the program distribution server through the interface apparatus 301 and is stored in the storage apparatus 302. The processor 307 reads the settlement support application 311 from the storage apparatus 302 and executes that application 311. The settlement support application 311 supports, for example, charging of the currency amount.

Figure 4:
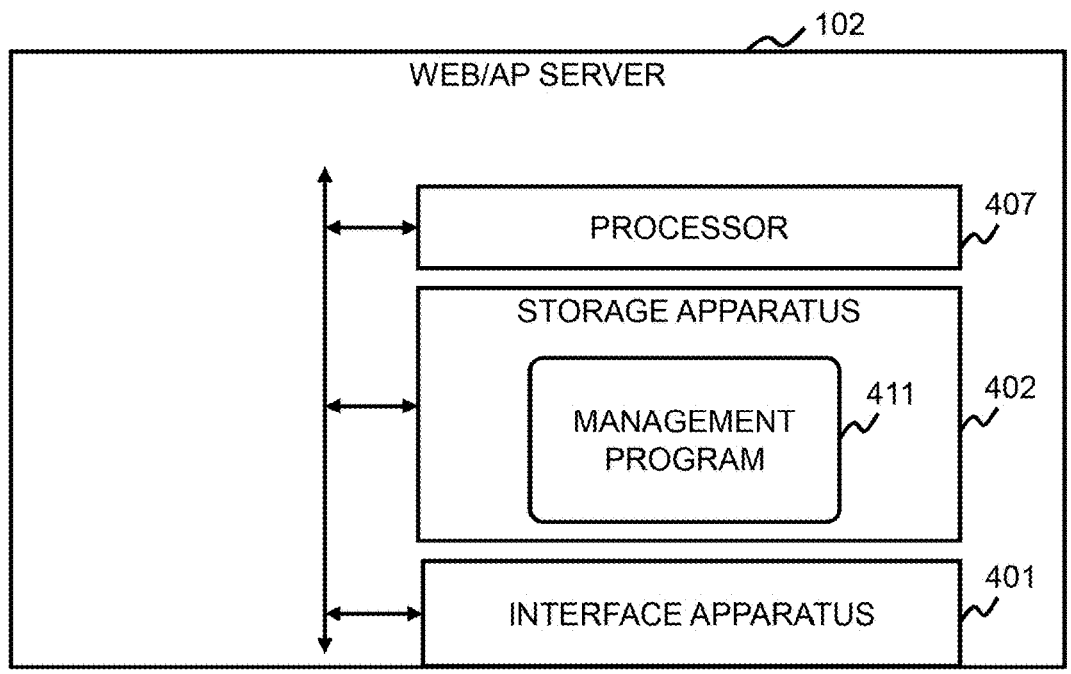
FIG. 4 illustrates a configuration example of a Web/AP server.

FIG. 4 illustrates a configuration example of the Web/AP server 102.

The Web/AP server 102 includes an interface apparatus 401, a storage apparatus 402, and a processor 407 connected thereto. The storage apparatus 402 stores a management program 411. The processor 207 reads the management program 411 from the storage apparatus 402 and executes that program 411. The management program 411 manages, for example, the settlement of the currency amount by using tables in the settlement DB 103.

Figure 5:
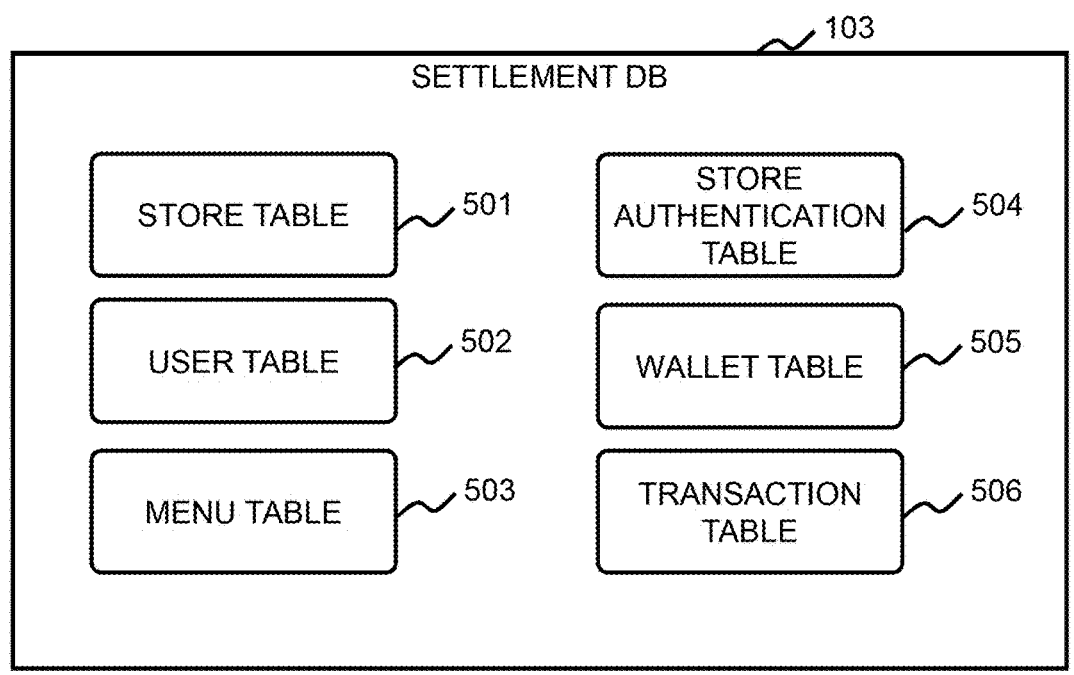
FIG. 5 illustrates an example of a table stored in a settlement DB (database)

FIG. 5 illustrates examples of the tables stored in the settlement DB 103.

The settlement DB 103 stores, for example, a store table 501, a user table 502, a menu table 503, a store authentication table 504, a wallet table 505, and a transaction table 506.

FIG. 6 illustrates a configuration example of the store table 501. Incidentally, in the following description, an "object" is one block of logical electronic data as seen from a program like an application. Data as an object(s) is, for example, a record(s), a key value pair(s), or a tuple(s). The record(s) will be indicated as an example(s) of the object(s).

The store table 501 retains information about stores. The store table 501 has, for example, a record for each store. Each record retains information such as a store ID 601, a store name 602, a contact 603, and a description 604. One store will be indicated as an example (a "notable store" in the explanation of FIG. 6).

The store ID 601 is a store ID of the notable store. The store name 602 is the name of the notable store. The contact 603 is a contact (for example, an e-mail address) of the notable store. The description 604 is supplementary information (for example, a text indicating sales points or the like) about the notable store.

FIG. 7 illustrates a configuration example of the user table 502.

The user table 502 retains information about users. The user table 502 has, for example, a record for each user. Each record retains information such as a user ID 701, a user name 702, a contact 703, a birth date 704, a registration date 705, and a valid flag 706. One user will be indicated as an example (a "notable user" in the explanation of FIG. 7).

The user ID 701 is a user ID of the notable user. The user name 702 is the name of the notable user. The contact 703 is a contact (for example, an e-mail address) of the notable user. The birth date 704 is a birth date of the notable user. The registration date 705 is a date when a user registration was conducted by the notable user. The valid flag 706 is a flag indicating whether the notable user is valid or not.

Figures 8, 9:
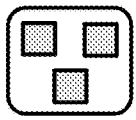
FIG. 8 illustrates a configuration example of a menu table.
FIG. 9 illustrates a configuration example of a store authentication table.

FIG. 8 illustrates a configuration example of the menu table 503.

The menu table 503 retains information about sales objects listed in the menu 140. The menu table 503 has, for example, a record for each sales object. Each record retains information such as a store ID 801, a sales object ID 802, a payment amount 803, bar code data 804, and image data 805. One sales object will be indicated as an example (a "notable sales object" in the explanation of FIG. 8).

The store ID 801 is a store ID of a store where the notable sales object is sold. The sales object ID 802 is the ID of the notable sales object. The payment amount 803 is a currency amount required to purchase the notable sales object. The bar code data 804 is data of a two-dimensional bar code associated with the notable sales object. The image data 805 is data indicating an image of the notable sales object (or a path to the relevant data).

FIG. 9 illustrates a configuration example of the store authentication table 504.

The store authentication table 504 retains authentication information of stores. In this embodiment, the authentication information of a store is fingerprint information of a store staff member or stamp information of the store.

The store authentication table 504 has, for example, a record for each store. Each record retains a store ID 901 and authentication information 902. One store will be indicated as an example (a "notable store" in the explanation of FIG. 9).

The store ID 901 is a store ID of the notable store. The authentication information 902 is authentication information of the notable store. The authentication information 902 includes information such as a feature amount 911 and a stamp seal 912.

The feature amount 911 represents a feature of the stamp seal 912. For example, if the authentication information is fingerprint information, the feature amount 911 indicates a feature of a fingerprint of the store staff member. Furthermore, for example, if the authentication information is stamp information, the feature amount 911 indicates a feature(s) of a contact site group 1505 (see FIG. 15) described later such as at least one of the size of the contact site group 1505 (for example, the size of a seal face), the shape of the contact site group 1505 (for example, the shape of the seal face), the number of contact sites 1506, and the arrangement of the contact sites 1506.

The stamp seal 912 indicates an image of the stamp seal 912. For example, if the authentication information is the fingerprint information, the stamp seal 912 indicates an image of the fingerprint of the store staff member. Furthermore, for example, if the authentication information is the stamp information, the stamp seal 912 indicates a planar-view image of a seal face of the store stamp 116.

FIG. 10 illustrates a configuration example of the wallet table 505.

The wallet table 505 retains information about a currency amount balance of users and an accumulated total of the currency amount used at stores. The wallet table 505 has, for example, a record for each user and each store. Each record retains information such as an ID 1001, a type 1002, a point balance 1003, tentatively reserved points 1004, a ticket balance 1005, and tentatively reserved tickets 1006. In the explanation of FIG. 10, users and stores will be collectively referred to as "using entities" and one using entity will be indicated as an example ("notable using entity" in the explanation of FIG. 10).

The ID 1001 is the ID of the notable using entity. The type 1002 is the type of the notable using entity (whether a user or a store).

If the notable using entity is a user, the point balance 1003 is the balance of the relevant user's points. If the notable using entity is a store, the point balance 1003 is an accumulated total of points used at the relevant store.

If the notable using entity is a user, the tentatively reserved points 1004 are an accumulated total of points which are tentatively reserved by the relevant user with one or more stores. If the notable using entity is a store, the tentatively reserved points 1004 are an accumulated total of points which are tentatively reserved by the relevant store with one or more users.

If the notable using entity is a user, the ticket balance 1005 is the balance of the relevant user's tickets. If the notable using entity is a store, the ticket balance 1005 is an accumulated total of tickets used at the relevant store.

If the notable using entity is a user, the tentatively reserved tickets 1006 are an accumulated total of tickets which are tentatively reserved by the relevant user with one or more stores. If the notable using entity is a store, the tentatively reserved tickets 1006 are an accumulated total of tickets which are tentatively reserved by the relevant store with one or more users.

FIG. 11 illustrates a configuration example of the transaction table 506.

The transaction table 506 indicates a history of settlement. The transaction table 506 is a record-adding (write-one)-type table. The transaction table 506 may be, for example, a DAG structure table; and in this case, nodes may be records and edges may represent a relationship between the records (for example, hash chains may be adopted). The wallet table 505 can be generated by tracking records of the transaction table 506. Therefore, the wallet table 505 can be also called a snapshot of the transaction table 506.

The transaction table 506 has, for example, a record for each settlement. Each record retains information such as an ID 1101, a token 1102, a payer 1103, a payee 1104, a currency amount 1105, and a status 1106. One settlement will be indicated as an example (a "notable settlement" in the explanation of FIG. 11).

The ID 1101 is the ID of the notable settlement (for example, a payment ID described later). The token 1102 is a token issued by charge processing.

The payer 1103 represents the ID and type of a payer of a currency amount for the notable settlement. The payee 1104 represents the ID and type of a payee of the currency amount for the notable settlement. Regarding the charge processing, the payer is a store (or issuer) and the payee is a user. Regarding the payment processing, the payer is the user and the payee is the store.

The currency amount 1105 is the currency amount for the notable settlement. The status 1106 indicates a status of the notable settlement.

Figure 12:
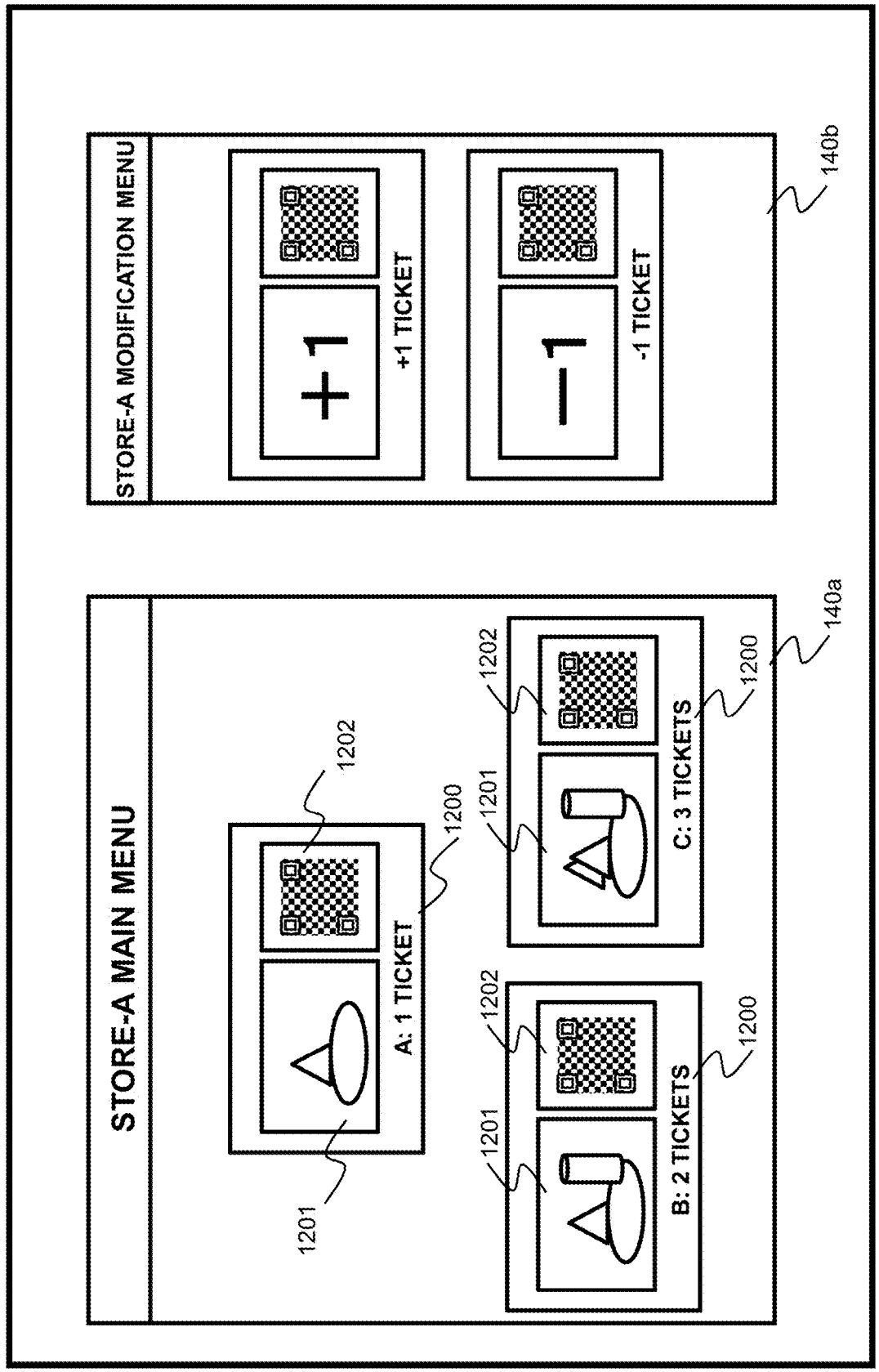
FIG. 12 illustrates an example of a menu.

FIG. 12 illustrates an example of the menu 140.

Regarding the menu 140, for example, there are: a menu 140*a* in which sales objects are listed and which is used to purchase the sales objects; and a menu 140*b* which is used to modify the currency amount.

For example, with respect to each sales object, a combination of a currency amount 1200 (for example, the number of tickets) required to purchase (or order) the relevant sales object, an image 1201 (a drawing or a photograph) indicating the sales object (for example, one or more foods/drinks), and a two-dimensional bar code 1202 representing the relevant currency amount and the relevant sales object is printed on the menu 140*a*. It is assumed that the menu 140*a* will be used repeatedly, so that the menu 140*a* may be a waterproofed or laminate-protected paper. The user selects one sales object which he/she wants to order, and uses the mobile terminal 109 to read the two-dimensional bar code 1202 corresponding to that sales object.

The menu 140*b* is a menu to modify the currency amount. The menu 140*b* is used to: cancel the payment if the user executes the payment processing by mistake; or make an additional payment of tickets for any deficit.

Figure 13:
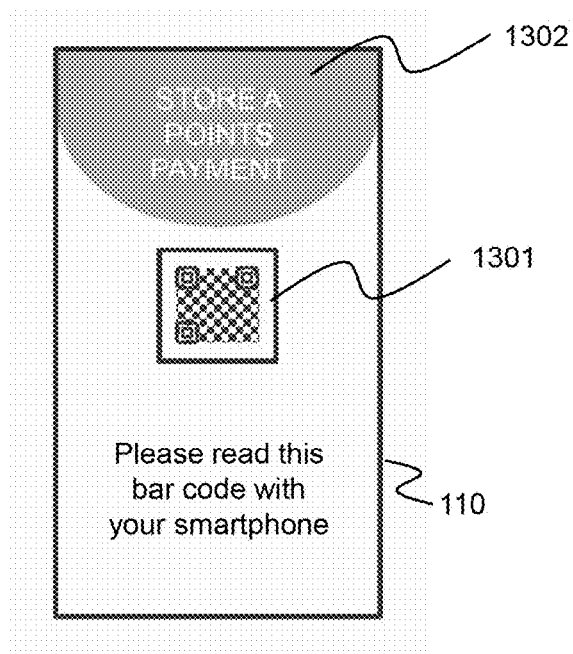
FIG. 13 illustrates an example of a store information card.

FIG. 13 illustrates an example of the store information card.

It is also assumed that the store information card 110 will be, for example, used repeatedly, so that the store information card 110 may be a waterproofed or laminate-protected paper. Information such as a store name 1302 indicating a store and a two-dimensional bar code 1301 representing store information including the store ID of the relevant store are printed on the store information card 110. The user 107 recognizes, by seeing the store name 1302, that the payee is the store indicated by the store name 1302. The two-dimensional bar code 1301 further includes, for example, information for accessing the Web/AP server 102 (for example, a URL [Uniform Resource Locator]).

In this embodiment, the user 107 needs to deposit, for example, cash (legal currency) with a local currency bureau (an example of an issuer) in advance and allocate (or charge) a currency amount equivalent to the relevant cash (for example, a point amount) to the mobile terminal 109. Such processing will be referred to as "charge processing." In this embodiment, the charge card 130 and the store tablet 111, besides the mobile terminal 109, are used for the processing for charging the currency amount.

Figure 14:
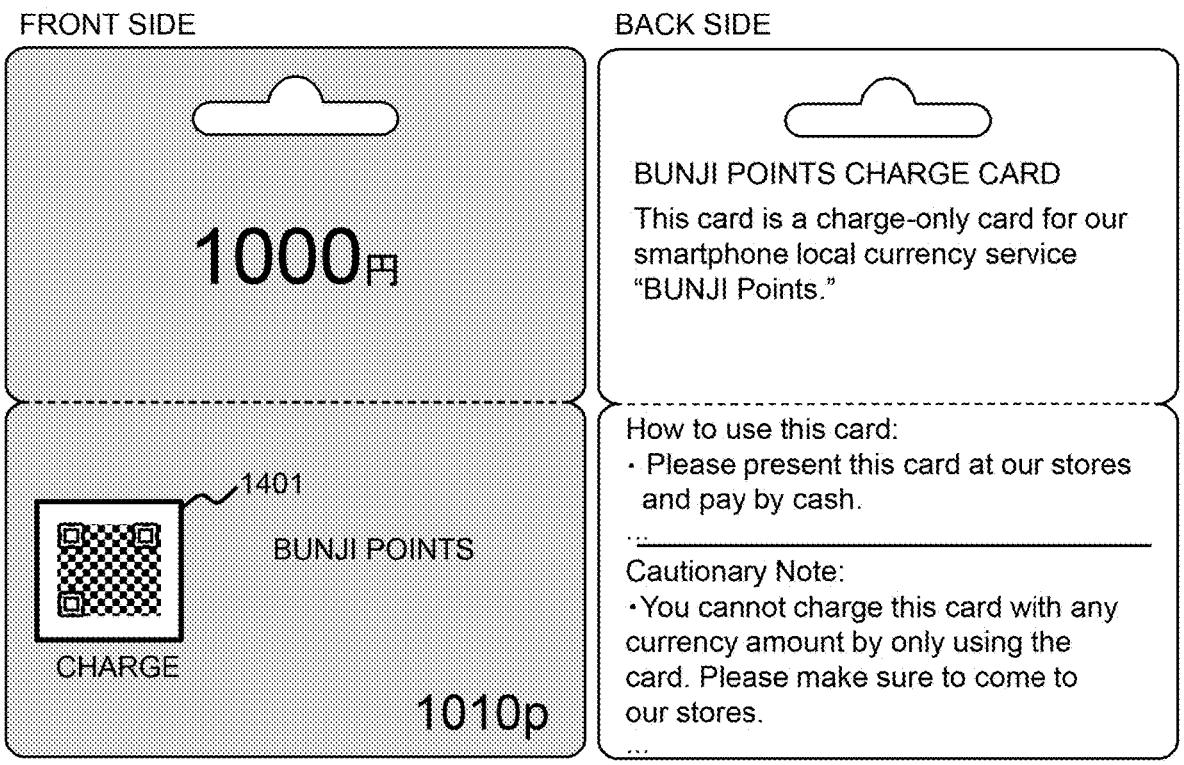
FIG. 14 illustrates an example of a charge card.

FIG. 14 illustrates a configuration example of the charge card 130.

This card 130 is a promotional item for helping the user 107 allocate (or change) the tick amount or the point amount to their own mobile terminal 109 as a target. When the user 107 comes to a store 112 which uses the target local currency, the user 107 picks up the charge card 130, in which a desired currency amount is indicated, and presents that card 130 together with cash equivalents to the store staff member 108. The store staff member 108 completes the charge processing by using the store tablet 111. Since the charge card 130 itself is not a money exchange ticket, it is safe even if the charge card 130 is exhibited at a place where it can be touched in public, for example, on the store counter 113.

A necessary cash mount for charging ("¥1000" in an example of FIG. 14) and a point amount allocated upon charging ("1010p" in the example of FIG. 14) are indicated on the front side of the charge card 130.

A two-dimensional bar code 1401 is also printed on the front side of the charge card 130. This two-dimensional bar code 1401 indicates the necessary cash quantity for the charging and the point amount to be allocated as described above and may further include additional information. For example, it is possible to think that the two-dimensional bar code 1401 may include information about a business operator who is an original payer of a premium point amount (10p in this case) which is the difference amount between the point amount to be allocated (an example of the currency amount) and the cash quantity. The function of this card 130 is used to solicit sponsorship from companies, thereby making it possible to contribute to the operation of the digital local currency and cooperate with the companies by printing advertisements of the companies on the card 130. As a result, the use of the local currency is promoted.

Incidentally, instead of or in addition to the charge card 130 for the point amount, there may be a charge card for the ticket amount.

Figure 15:
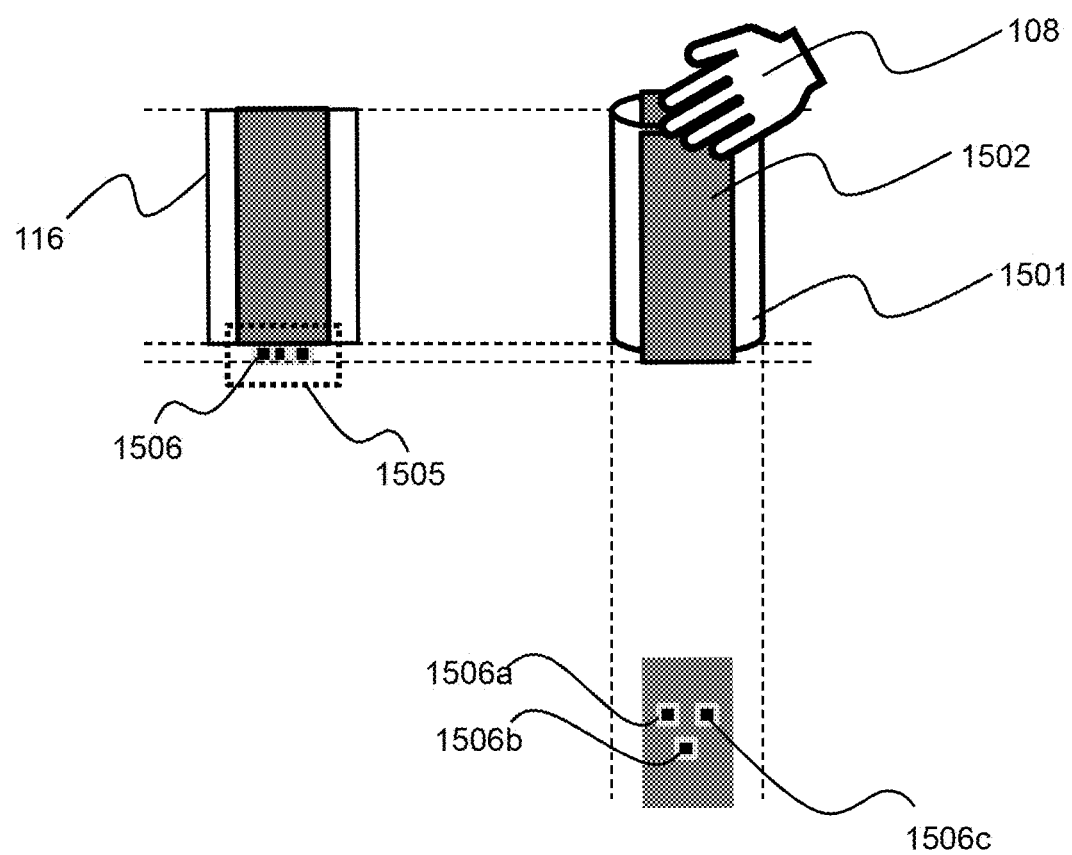
FIG. 15 illustrates an example of the structure of a store stamp.

FIG. 15 illustrates an example of the configuration of the store stamp 116.

This stamp 116 is made by, for example, pasting a conductive seal face member 1502 on an insulating base material 1501 and attaching a contact site group 1505 to its seal face. The contact site group 1505 is configured of one or more contact sites 1506 (for example, 1506*a* to 1506*c*). A stamp seal (a seal face figure) is configured by the placement of the contact sites 1506. The feature of the stamp seal varies depending on, for example, the number of contact points (the number of the contact sites 1506) and a shape formed by the plurality of contact points and the store staff member 108 can identify the feature. The relationship between stamp seals and stores is managed by the store authentication table 504 as indicated in FIG. 9.

The store stamp 116 is a unit having the contact site group 1505 configured of the one or more contact sites 1506 which contact the touch screen at the same time.

Figure 16:
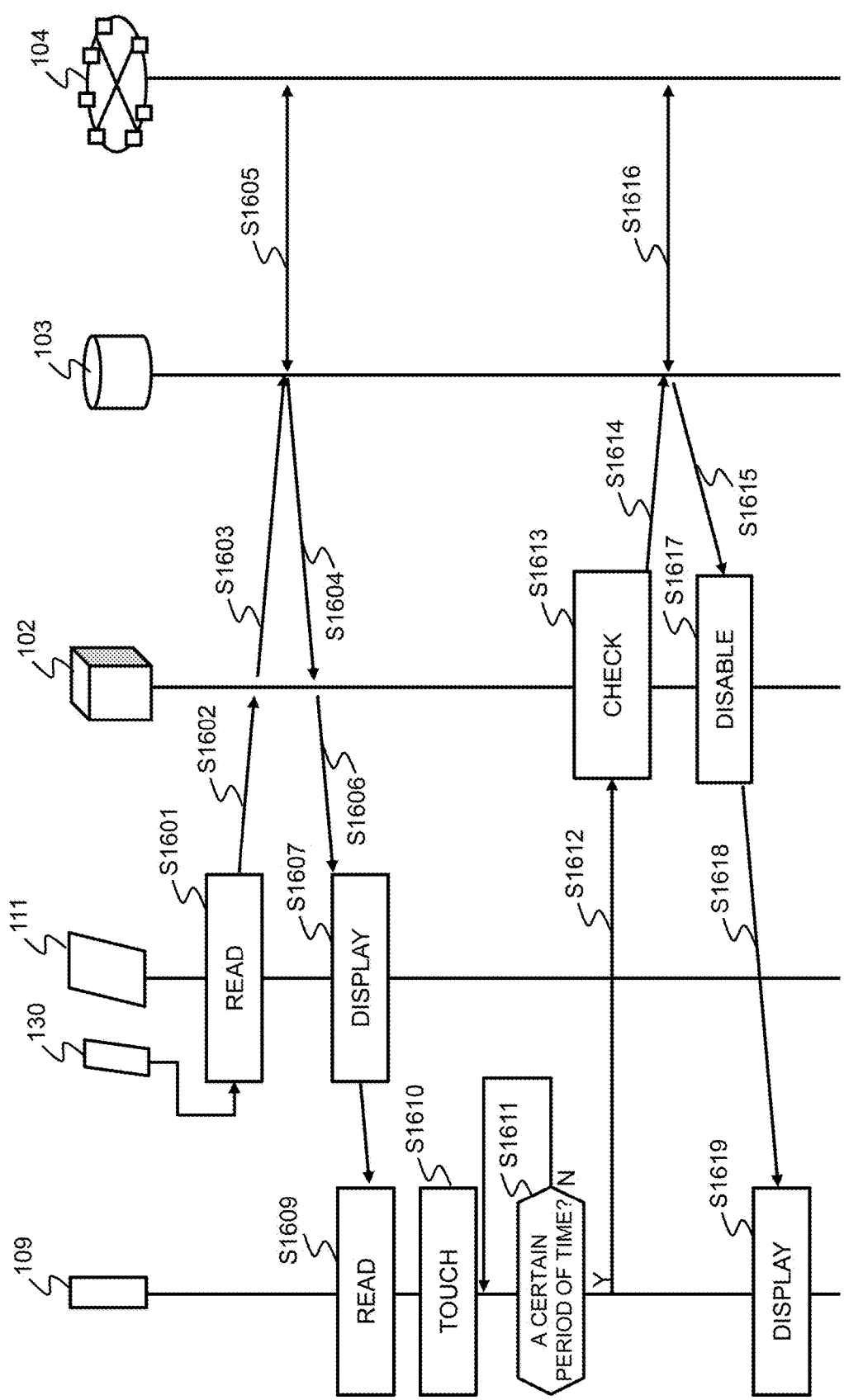
FIG. 16 illustrates an example of a flow of charge processing.

FIG. 16 illustrates an example of a flow of the charge processing. Incidentally, the point amount is adopted as the currency amount in the explanation of FIG. 16.

Firstly, the user 107 presents the charge card 130 to the store staff member 108. The store staff member 108 has the settlement support application 311 of the store tablet 111 read the two-dimensional bar code 1401 (an example of a first bar code) printed on the front side of the card 130 (S1601). The settlement support application 311 transmits the charge information indicated by the read two-dimensional bar code 1401 of the charge card 130 to the Web/AP server 102 (S1602). In this embodiment, the charge information includes an amount to be charged (the necessary cash quantity for the charging and the point amount to be allocated), the store ID, a card issuer ID (for example, an ID of a company which bears the aforementioned premium point amount).

The management program 411 of the Web/AP server 102 executes charge reservation processing on the settlement DB 103 (S1603). Consequently, with the wallet table 505, the point amount indicated by the charge information is added to the tentatively reserved points 1004 with respect to the store 112 with the store ID indicated by the charge information. Furthermore, a record indicating the tentative reservation is added to the transaction table 506. A charge token is issued by the settlement DB 103 (S1604). The charge token may be issued by the management program 411. The charge token includes the charge information. Incidentally, correctness of the processing according to S1603 may be verified by the blockchain NW 104 (S1605). Specifically speaking, for example, each of nodes constituting the blockchain NW 104 has at least the table 506 of the tables 505 and 506 and each node may verify the record added in association with the processing according to S1603 (the record transmitted from the Web/AP server 102).

Figure 17:
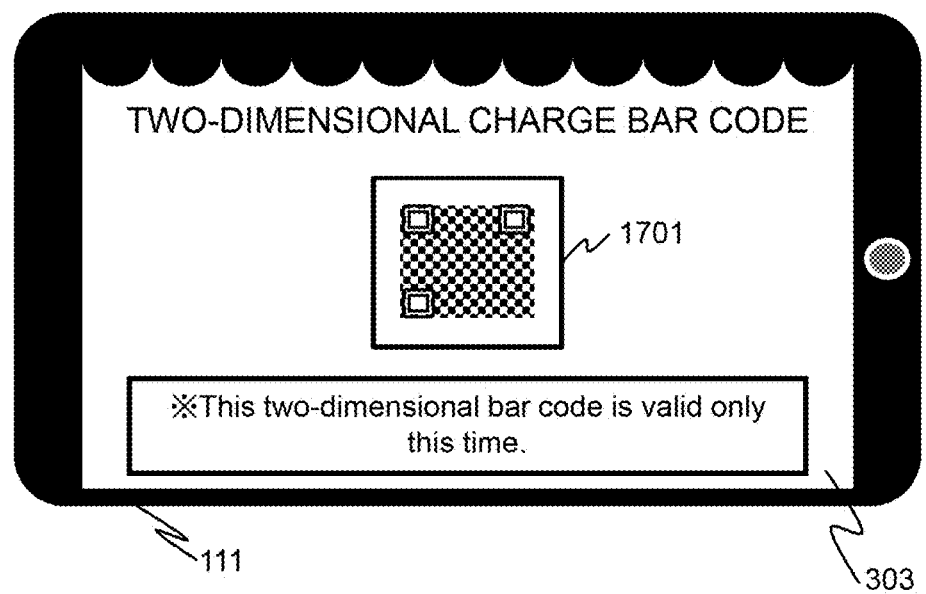
FIG. 17 illustrates an example of a one-time charge bar code displayed on a store tablet.

The management program 411 of the Web/AP server 102 which has received the charge token generates a two-dimensional bar code representing the charge token (S1606). The two-dimensional bar code generated by the management program 411 is displayed on the touch screen 303 of the store tablet 111 by the settlement support application 311 of the store tablet 111 (S1607). FIG. 17 illustrates an example of the display of the two-dimensional bar code 1701. The two-dimensional bar code 1701 is a one-time two-dimensional bar code. Such two-dimensional bar code 1701 will be hereinafter referred to as the "two-dimensional charge bar code 1701." The two-dimensional charge bar code 1701 is an example of a second bar code. The generated two-dimensional charge bar code 1701 includes information of the charge token. Consequently, every time the two-dimensional bar code 1401 of the same card 130 is read, a token with different content is issued and, therefore, a different two-dimensional charge bar code 1701, that is, a one-time two-dimensional bar code is generated and displayed. Thus, a fraud of the point amount by unauthorized replacement of the two-dimensional bar code 1401 can be prevented by using the one-time two-dimensional bar code 1701 which is different from the two-dimensional bar code 1401 included in the charge card 130. Incidentally, the two-dimensional charge bar code 1701 further includes, for example, information for accessing the Web/AP' server 102 (for example, a URL).

The user 107 uses the local currency application 211 of the mobile terminal 109 to read the two-dimensional charge bar code 1701 displayed on the store tablet 111 (S1609). Consequently, the local currency application 211 displays a charge UI on the touch screen 203 of the mobile terminal 109. Although the charge UI is not illustrated in the drawing, features of the charge UI are the same as those of a payment UI described later. Specifically speaking, one of the features of the charge UI is that a user-side UI for accepting a touch operation by the user 107 and a store-side UI for accepting a touch operation by the store staff member 108 are placed. The touch operation by the store staff member 108 may be a touch with their finger or a touch with the store stamp 116 as described later.

When checking the point amount to be charged, both the user 107 and the store staff member 108 simultaneously touch the touch screen on the mobile terminal 109 (S1610). Specifically speaking, the user 107 touches the user-side UI in the charge UI displayed on the touch screen 203 of the mobile terminal 109 and the store staff member 108 touches the store-side UI in the same charge UI.

The local currency application 211 measures time during which the touch operation on the user-side UI and the touch operation on the store-side UI are simultaneously continued (time during which the user-side UI and the store-side UI are simultaneously and continuously touched) and judges whether the measured time has reached a certain period of time or not (S1611). If the judgment result in S1611 is false, the local currency application 211 waits until the judgment result in S1611 becomes true. During such time, if the touch of at least one of the user-side UI and the store-side UI is no longer detected, the charge processing may be canceled. In other words, when either the user 107 or the store staff member 108 stops touching their UI, this may be recognized as a request for cancellation of the charge processing.

If the judgment result in S1611 is true (that is, after both the user 107 and the store staff member 108 has kept touching their UI's for the specified period of time), the local currency application 211 transmits a charge request to the Web/AP server 102 (S1612). The transmitted charge request is associated with the user ID of the user 107 in addition to the information of the charge token represented by the read two-dimensional charge bar code. The user ID may be, for example, the user ID which is registered in the local currency application 211 of the mobile terminal 109 in advance and individual information of the mobile terminal 109 may be included instead of or in addition to the user ID. Furthermore, the charge request is also associated with the authentication information of the store 112 to which the store staff member 108 belongs. The authentication information is the fingerprint information of the store staff member 108 or the stamp information of the store stamp 116 of the store 112. The fingerprint information includes a feature amount or a finger print image of a fingerprint of the store staff member 108. The stamp information includes a feature amount or a stamp seal image of a stamp seal of the store stamp 116.

The management program 411 of the Web/AP server 102 which has received the charge request identifies the authentication information 902, which corresponds to the store ID identified from the charge token associated with the relevant charge request, from the store authentication table 504 and judges whether the authentication information associated with the relevant charge request is correct or not, by using the identified authentication information 902 (S1613). If the judgment result in S1613 is false, the management program 411 may return a charge failure (which is not illustrated in the drawing) to the local currency application 211 of the mobile terminal 109. In this case, the local currency application 211 may display a notice of the charge failure on the touch screen 203 after receiving the response of the charge failure.

If the judgment result in S1613 is true, the management program 411 of the Web/AP server 102 associates the user ID, which is associated with the relevant charge request, with the amount to be charged and the store ID which are represented by the relevant charge token (S1614). Specifically speaking, for example, the management program 411 assigns the point amount, which is tentatively reserved with respect to the relevant store ID, to the user 107. Regarding the wallet table 505 in the settlement DB 103, the point balance 1003 of the user 107 increases and the tentatively reserved points 1004 of the store 112 decrease. Furthermore, a record indicating that the tentatively reserved point amount has been assigned to the user 107 is added to the transaction table 506. Incidentally, the correctness of the processing described in this paragraph may be verified by the blockchain NW 104 (S1616). Specifically speaking, for example, each of the nodes constituting the blockchain NW 104 may verify the record added in association with the processing described in this paragraph.

As the settlement DB 103 has been successfully updated (S1615), the management program 411 of the Web/AP server 102 disables the two-dimensional charge bar code 1701 (S1617). To "disable the two-dimensional charge bar code" is to register, in the storage apparatus 402, that the charge token represented by the relevant two-dimensional charge bar code 1701 has been used, so that the charge processing will not be processed even if the Web/AP server 102 receives information of the same charge token. Consequently, for example, even if the same two-dimensional charge bar code 1701 displayed on the store tablet 111 is read by the local currency application 211 of the mobile terminal 109, the charging will fail.

The management program 411 of the Web/AP server 102 responds a success of the charging to the mobile terminal 109 (S1618); and the local currency application 211 of the mobile terminal 109 which has received that response displays a charge success notice on the touch screen 203 (S1619).

The point amount is charged to the mobile terminal 109 as described above (similarly, the ticket amount may be charged to the mobile terminal 109). The currency amount indicated by the charge card 130 is enabled (or can be charged) via the store tablet 111.

Figure 19:
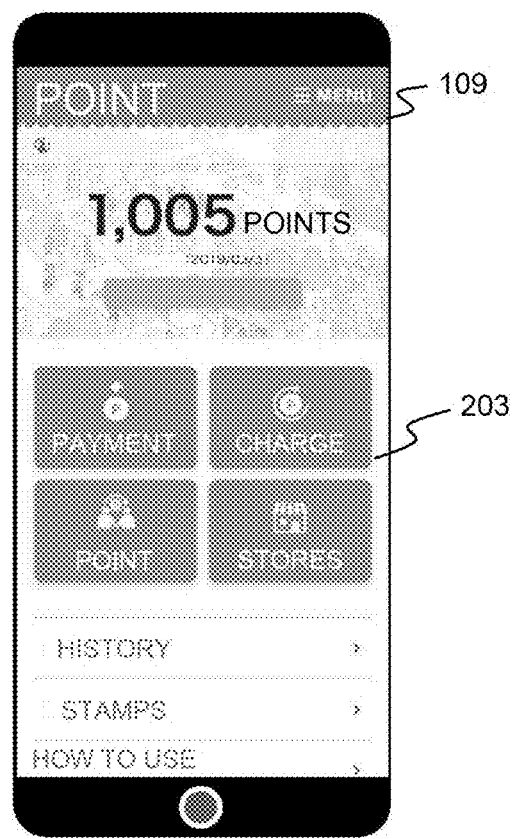
FIG. 19 illustrates an example of an application top UI displayed on the mobile terminal.

FIG. 19 illustrates an example of an application top UI displayed on the mobile terminal 109.

Once the local currency application 211 is activated, the application top UI illustrated in FIG. 19 is displayed. The application top UI displays the currency amount (for example, the point amount) retained by the user 107. The application top UI includes, in addition to a UI (such as an icon) for the payment and an icon for the charging, a UI for giving and receiving the currency amount between users and a UI for browsing a list of stores where this local currency can be used. Furthermore, the application top UI may include a UI for reading a two-dimensional bar code, which is required to make a payment or perform charging, via the camera 204. Furthermore, the application top UI may include a UI for checking a history of the currency amount used by the user 107 and a UI for checking store visit records indicating the number of times the user 107 has visited the store 112 designated by the user 107.

Figure 20:
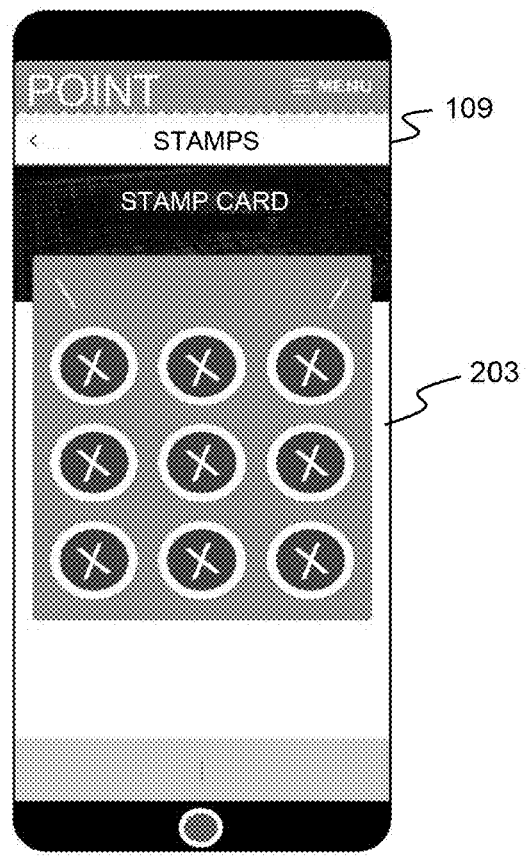
FIG. 20 illustrates an example of a store visit check UI displayed on the mobile terminal.

FIG. 20 illustrates an example of a store visit check UI displayed on the mobile terminal.

For example, when the UI for checking the store visit records of the store 112 designated by the user 107 is designated in the application top UI, the store visit check UI is displayed on the touch screen 203 of the mobile terminal 109. One mark is obtained for each store every time at least one payment is made. Mark distribution timing may be set for each store. For example, the mark distribution timing may be set so that the mark can be distributed without involving any payment or the distribution may be limited to once a day. If a specified number of store visit marks are collected (nine marks in an example of FIG. 20), a service specific to the relevant store may be provided in exchange. All the marks may be returned to zero at the timing when the service is provided.

Figure 21:
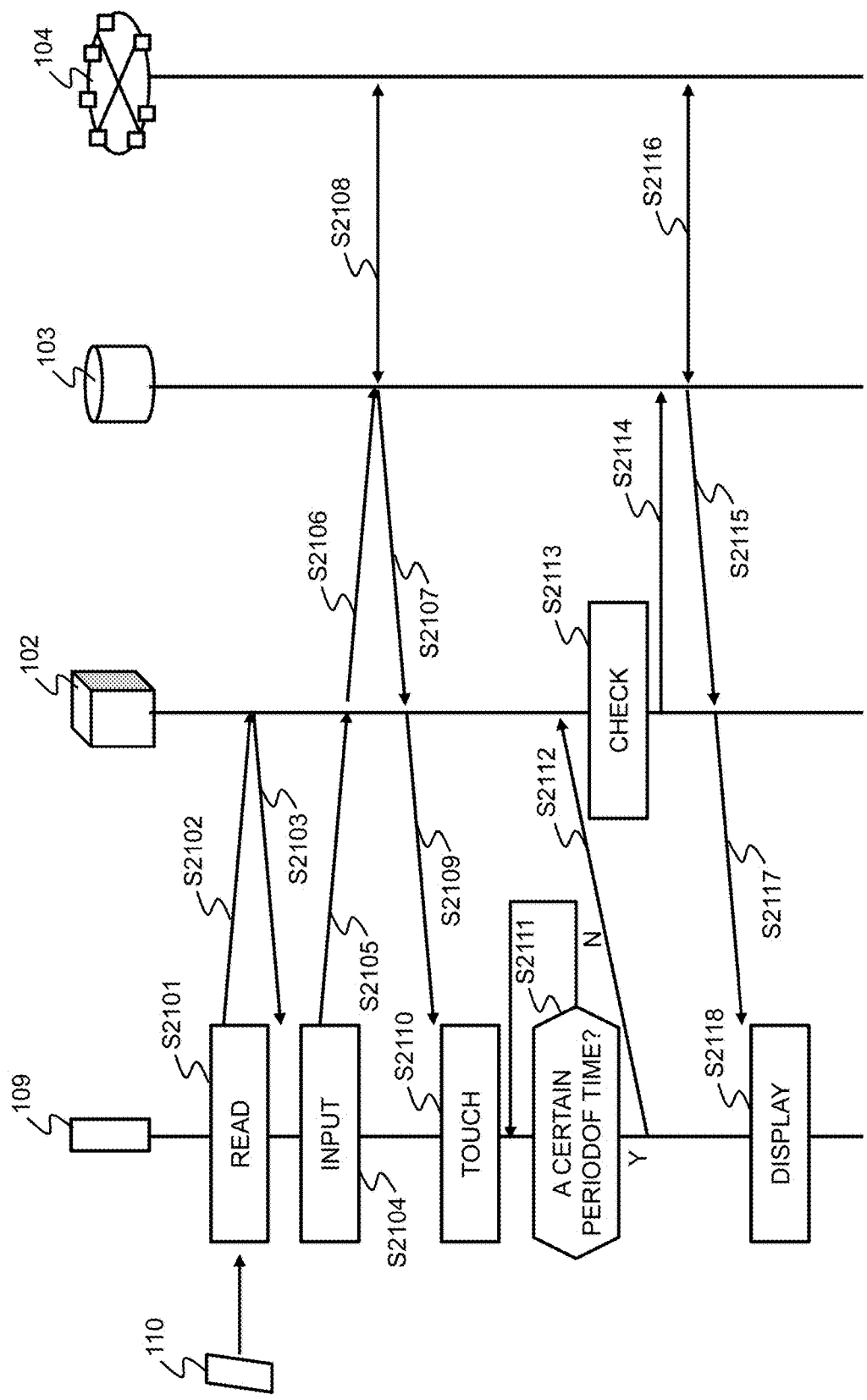
FIG. 21 illustrates an example of a flow of payment processing.

FIG. 21 illustrates an example of a flow of payment processing. Incidentally, the ticket amount is adopted as the currency amount in the following explanation of the payment processing.

The user 107 uses the local currency application 211 of the mobile terminal 109 to read the two-dimensional bar code 1301 on the store information card 110 (S2101). The local currency application 211 connects to the Web/AP server 102 according to a URL represented by the read two-dimensional bar code 1301 and transmits a request associated with the store information represented by the read two-dimensional bar code 1301 to the Web/AP server 102 (S2102). The management program 411 of the Web/AP server 102 which has received that request acquires a group of records associated with the store ID in the store information associated with the request from the menu table 503 in the settlement DB 103 and responds store menu information according to the acquired group of records to the mobile terminal 109 (S2103). Incidentally, S2101 to S2103 are omitted and the menu 140a placed at the store 112 may be used in S2104 and subsequent steps. The two-dimensional bar code 1202 printed on the menu 140a may include information indicating the URL of the Web/AP server 102.

In the following description, the store menu indicated by the store menu information responded to the mobile terminal 109 and displayed on the mobile terminal 109 will be used instead of using the menu 140a.

Figure 22:
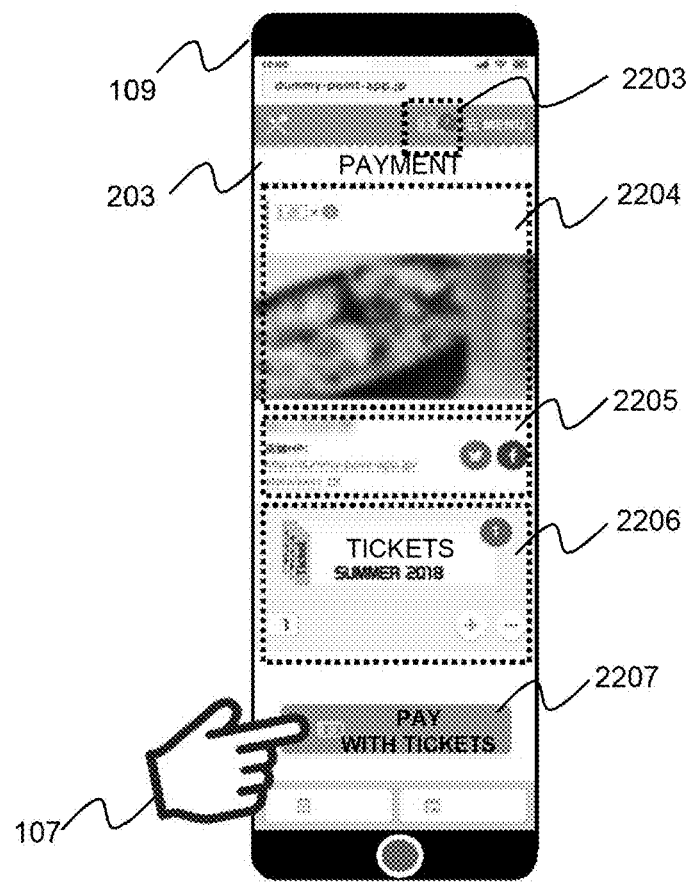
FIG. 22 illustrates an example of a payment condition input UI displayed on the mobile terminal.
Figure 23:
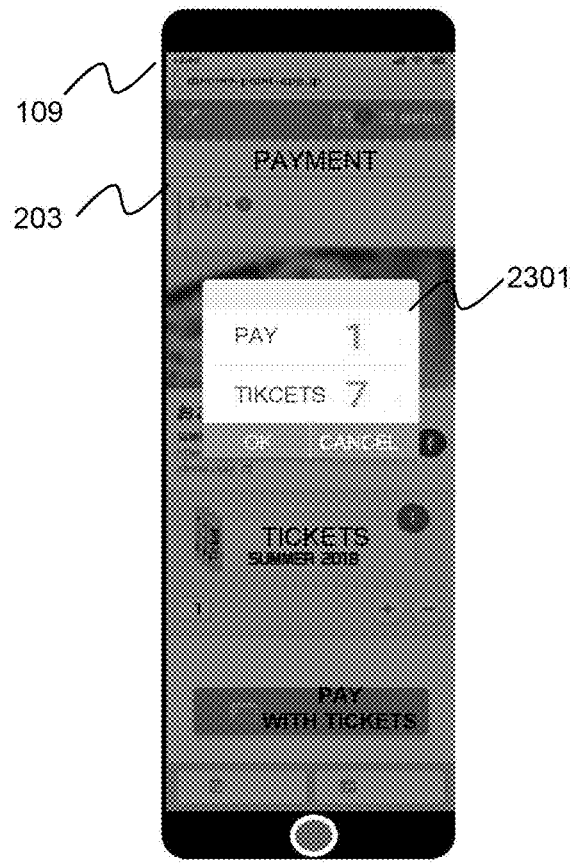
FIG. 23 illustrates an example of a payment condition check UI displayed on the mobile terminal.

The user 107 designates a desired sales object from the store menu by using the mobile terminal 109. Then, a payment condition input UI which accepts input of a payment condition of the relevant sales object is displayed on the touch screen 203 of the mobile terminal 109 by the local currency application 211. FIG. 22 illustrates an example of the payment condition input UI. The payment condition input UI displays, for example, a ticket amount (ticket balance) 2203 linked to and possessed by the user 107, information 2204 of a designated sales object, and information 2205 of the store 112 as a payee of the payment. Furthermore, the payment condition input UI displays a ticket amount adjustment UI 206 and a payment button 2207. The user 107 inputs the ticket amount to be paid to the ticket amount adjustment UI 2206 and presses the payment button 2207 (S2104). Since a necessary ticket amount is determined for each sales object, the ticket amount may be adjusted by inputting the number of sales objects. Subsequently, the local currency application 211 displays, a payment condition check UI 2301 (dialogue), which is illustrated in FIG. 23, on the touch screen 203. This UI is a UI for causing the user 107 to check the ticket amount to be paid. The payment condition check UI 2301 displays the ticket amount to be paid (for example, one ticket) and a ticket amount retained by the user 107 (for example, 7 tickets). If the payment condition is as intended, the user 107 presses an OK button on this UI 2301.

Subsequently, the local currency application 211 transmits a payment request to the Web/AP server 102 (S2105). The payment request is associated with the input ticket amount, the user ID of the user 107, and the store ID of the store 112.

The management program 411 of the Web/AP server 102 which has received the payment request tentatively reserve the ticket amount, which is associated with the relevant payment request, with the settlement DB 103 with respect to the user ID and the store ID which are associated with the relevant payment request (S2106). Consequently, the ticket amount is added to the tentatively reserved tickets 1006 in the wallet table 505 with respect to each of the relevant user ID and the relevant store ID. Furthermore, a record indicating the tentative reservation is added to the transaction table 506. Incidentally, correctness of the processing according to S2106 may be verified by the blockchain NW 104 (S2108). Specifically speaking, for example, the record added in association with the processing according to S2106 (the record transmitted from the Web/AP server 102) may be verified by each of the nodes constituting the blockchain NW 104.

The Web/AP server 102 receives a response of the tentative reservation (S2107) and responds a payment ID to the mobile terminal 109 (S2109). The payment ID is a unique ID used through this payment processing and is associated with information which is associated with the payment request.

The local currency application 211 of the mobile terminal 109 which has received the payment ID displays the payment UI on the touch screen 203 of the mobile terminal 109.

Figure 24:
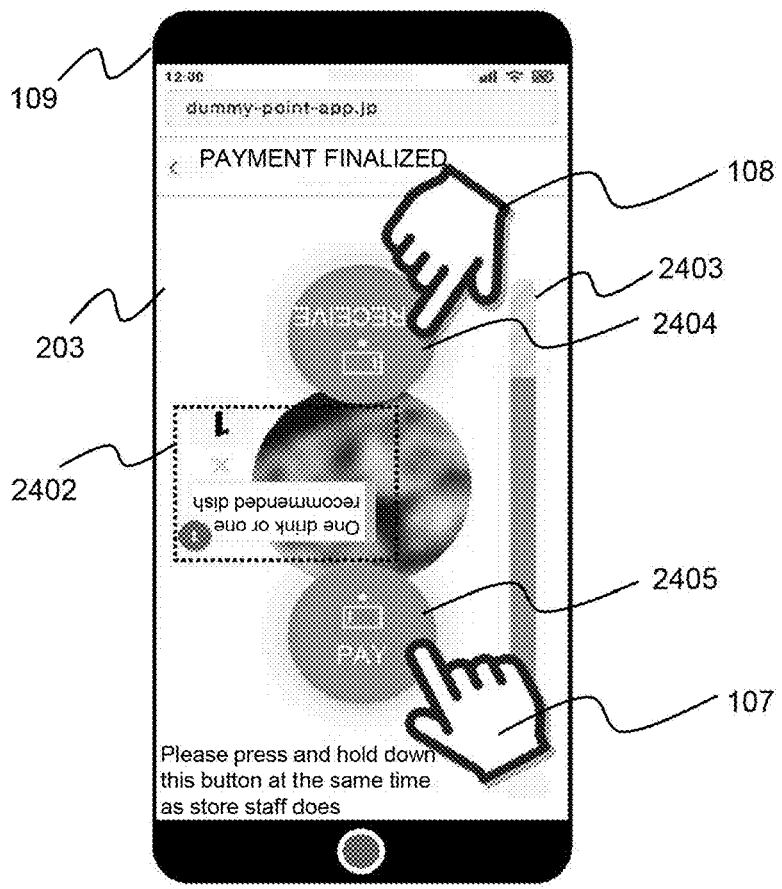
FIG. 24 illustrates an example of a payment UI displayed on the mobile terminal.

FIG. 24 illustrates an example of the payment UI. Incidentally, in this embodiment, a lengthwise direction of the mobile terminal 109 is an up-and-down direction of the mobile terminal 109 (that is, the mobile terminal 109 is used in a vertical orientation), but a widthwise direction of the mobile terminal 109 may be the up-and-down direction of the mobile terminal 109 (that is, the mobile terminal 109 may be used in a horizontal orientation).

The payment UI is designed so that a user-side UI 2405 for accepting a touch operation by the user 107 and a store-side UI 2404 for accepting a touch operation by the store staff member 108 are placed. The user-side UI 2405 and the store-side UI 2404 are placed along the lengthwise direction of the mobile terminal 109 and are positioned opposite each other on both sides of the center of the mobile terminal 109. The upper side (or the lower side) of the mobile terminal 109 for the user 107 is the lower side (or the upper side) of the mobile terminal 109 for the store staff member 108. Information 2402 indicating the relevant sales object and the ticket amount to be paid is displayed in an open space between the user-side UI 2405 and the store-side UI 2404 when the upper side for the store staff member 108 is placed as the upper side. Consequently, validity of the payment can be mutually checked face-to-face by watching the information 2402. In an example of this drawing, both the user 107 and the store staff member 108 agree that one serving of "one drink or one recommended dish" is ordered and a total of one ticket is to be paid.

The user 107 presents the mobile terminal 109, on which the payment UI is displayed, to the store staff member 108. Both the user 107 and the store staff member 108 simultaneously perform the touch operation on the touch screen 203 (S2110 in FIG. 21). For the payment, not only the operation by the user 107, but also the face-to-face operation by the store staff member 108 using the mobile terminal 109 of the user 107 is required. Therefore, the user 107 and the store staff member 108 can have the opportunity to communicate with each other.

In this embodiment, as a condition for completion of the payment, adopted is the condition that time during which the user-side UI 2405 and the store-side UI 2404 are simultaneously and continuously touched is a certain period of time. Specifically speaking, the local currency application 211 measures time during which the touch operation on the user-side UI 2405 and the touch operation on the store-side UI 2404 are continued simultaneously and judges whether the measured time has reached a certain period of time or not (S2111 in FIG. 21). Therefore, the user 107 needs to continue touching the user-side UI 2405 and the store staff member 108 needs to continue touching the store-side UI 2404. Consequently, a certain amount of time is given for the communication between the user 107 and the store staff member 108 and, as a result, active communication between the user 107 and the store staff member 108 is induced.

Incidentally, a touch gauge 2403 which is a gauge indicating the measured time for the simultaneous touches is provided on the payment UI. The local currency application 211 measures the time during which both the UI 2405 and the UI 2404 are simultaneously and continuously touched by the user 107 and the store staff member 108; and as the local currency application 211 measures the time, it continues to increase the measured time in the touch gauge 2403. When the measured time reaches a certain period of time, the measured time in the touch gauge 2403 becomes full. Consequently, a countdown to the end of the time capable of communication is visualized, so that further inducement of the active communication between the user 107 and the store staff member 108 can be expected. Incidentally, the touch gauge 2403 may be adopted or not adopted for either the payment UI or the charge UI.

The touch gauge 2403 is, for example, a bar-like gauge and extends in the lengthwise direction within a range from the user-side UI 2405 to the store-side UI 2404. Consequently, the touch gauge 2403 is easily visible from the user 107 and the store staff member 108.

If the judgment result in S2111 is false, the local currency application 211 waits until the judgment result in S2111 becomes true. During such time, if the touch on at least one of the user-side UI 2405 and the store-side UI 2404 is no longer detected, the charge processing may be canceled. Specifically speaking, when either the user 107 or the store staff member 108 stops touching, this may be recognized as a request for cancellation of the charge processing. For example, if the payment content is not correct or if the order is mistaken, the payment processing can be suspended by both or either one of them removes their finger from the mobile terminal 109 during the aforementioned certain period of time.

The user 107 and the store staff member 108 touch the screen 203 on one mobile terminal 109 to agree on the payment as described above. While they continue touching the screen 203, the local currency application 211 acquires the authentication information of the store. The authentication information is fingerprint information of the finger which touches the store-side UI 2404 (or stamp information of the store stamp 116 described later). Specifically speaking, the touch operation by the store staff member 108 serves as both the agreement on the payment and the input of the authentication information. Since the store staff member 108 does not have to input the authentication information separately, this is highly convenient for the store staff member 108. The same can be said about the aforementioned charge processing.

If the touches continue for a certain period of time, the local currency application 211 of the mobile terminal 109 transmits a payment execution instruction to the Web/AP server 102 (S2112). This instruction is associated with the payment ID responded in S2109 and the above-described authentication information acquired from the local currency application 211.

Figure 27:
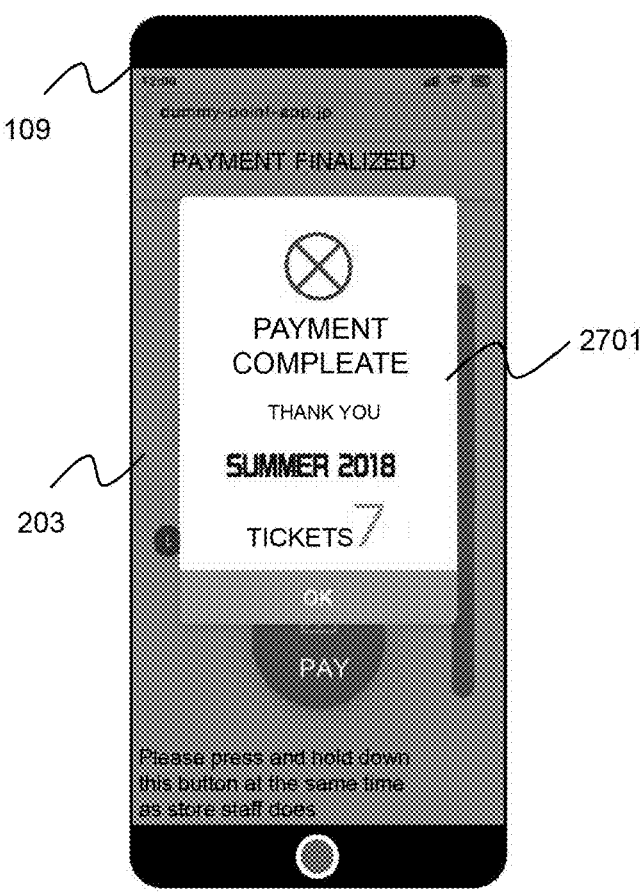
FIG. 27 illustrates an example of a payment failure notice displayed on the mobile terminal.

The management program 411 of the Web/AP server 102 which has received this instruction identifies the authentication information 902, which corresponds to the store ID linked to the payment ID associated with the relevant instruction, from the store authentication table 504 and judges whether the authentication information associated with the relevant instruction is correct or not, by using the identified authentication information 902 (S2113). If the judgment result in S2113 is false, the management program 411 may return a failure of the payment to the local currency application 211 of the mobile terminal 109. In this case, the local currency application 211 may display a payment failure notice on the touch screen 203 after receiving the payment failure response. FIG. 27 illustrates an example of the payment failure notice (dialogue) 2701. As FIG. 27 is compared with FIG. 23, the ticket amount possessed by the user 107 has not changed because of the failure of the payment.

If the judgment result in S2113 is true, the management program 411 of the Web/AP server 102 commits processing for subtracting the ticket amount to be paid from the ticket amount possessed by the user 107 with respect to the settlement DB 103 (S2114). Consequently, in the wallet table 505 in the settlement DB 103, the ticket balance 1005 and the tentatively reserved tickets 1006 decrease with respect to the user 107 who is linked to the payment ID, and the ticket balance 1005 increases and the tentatively reserved tickets 1006 decrease with respect to the store which is linked to the payment ID. Furthermore, a record indicating that the ticket amount which was tentatively reserved has been paid by the user 107 to the store 112 is added to the transaction table 506. Incidentally, correctness of the processing in S2114 may be verified by the blockchain NW 104 (S2116). Specifically speaking, for example, the record added in association with the processing in S2114 may be verified by each of the nodes constituting the blockchain NW 104.

Figure 25:
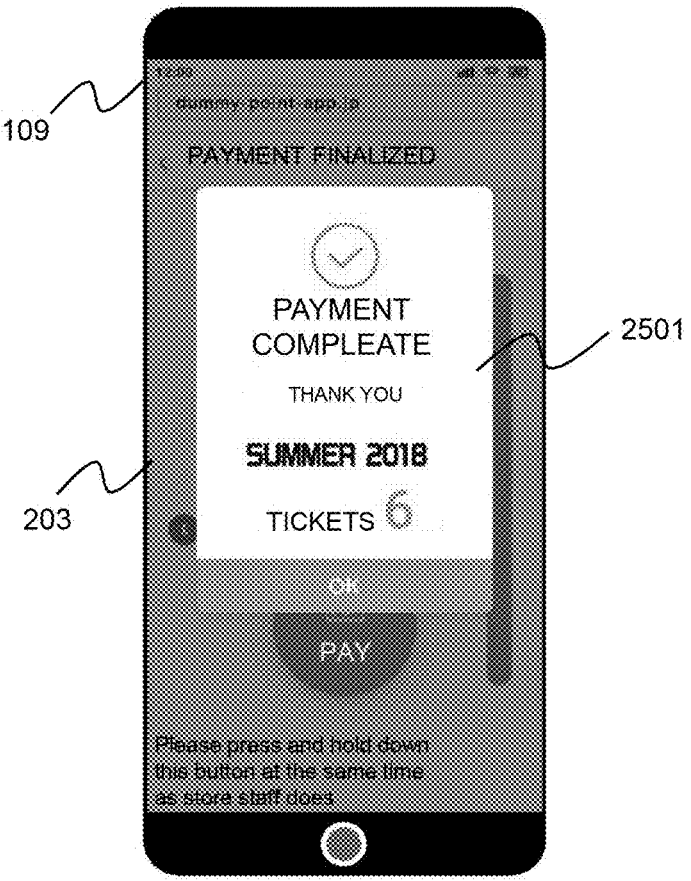
FIG. 25 illustrates an example of a payment completion notice displayed on the mobile terminal.

When the management program 411 of the Web/AP server 102 receives a commitment success notice on the settlement DB 103 (S2115), it sends a payment completion response to the mobile terminal 109 (S2117). The local currency application 211 of the mobile terminal 109 which has received that response displays a payment completion notice on the touch screen 203 (S2118). FIG. 25 illustrates an example of a payment completion notice 2501. As FIG. 25 is compared with FIG. 23, the ticket amount possessed by the user 107 has decreased because of the completion of the payment.

Figure 26:
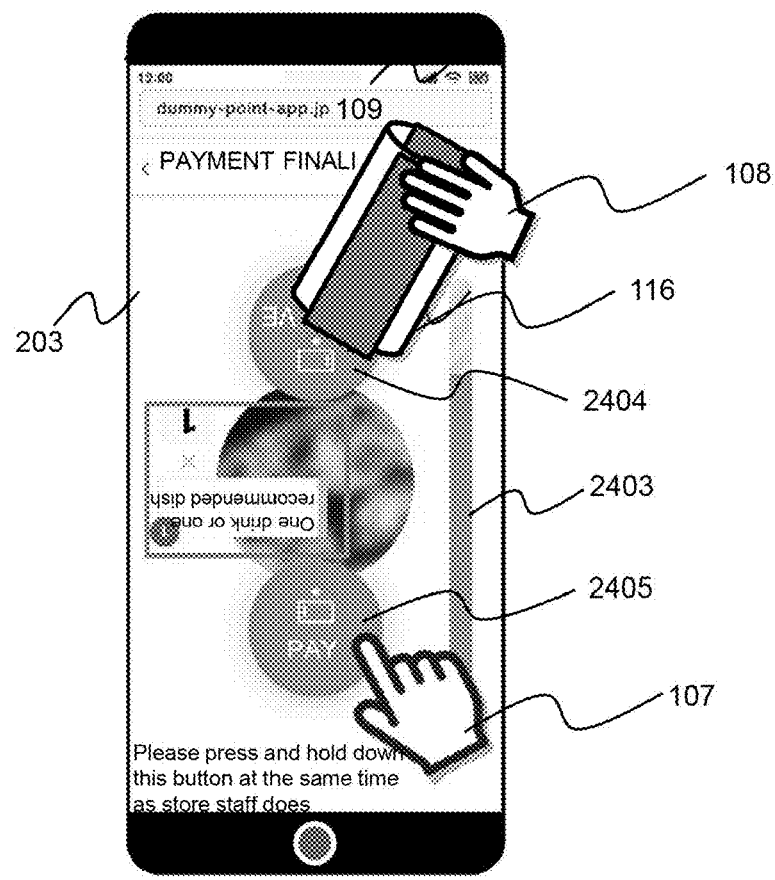
FIG. 26 illustrates an example of a payment using the store stamp.

The payment of the ticket amount is made as described above. The content of the settlement may be reported to the payment the user 107 and the store staff member 108 by, for example, e-mail or an SMS (Short Messaging Service) concurrently with the payment completion notice or the payment processing may be executed in cooperation with a POS (Point Of Sale) or an automatic order system. Furthermore, the touch operation by the store staff member 108 may be a touch operation by the store stamp 116 as illustrated in FIG. 26. Authentication is granted by using the authentication information of the store 112 such as the fingerprint information of the store staff member 108 or the stamp information of the store stamp 116. Consequently, security can be enhanced and fraud by a malignant third party can be prevented. For example, if the two-dimensional bar code of the store information card 110 is replaced by the third party in an unauthorized manner, the judgment result in S2113 becomes false and the payment fails.

The above explanation has been provided about this embodiment.

Figure 18:
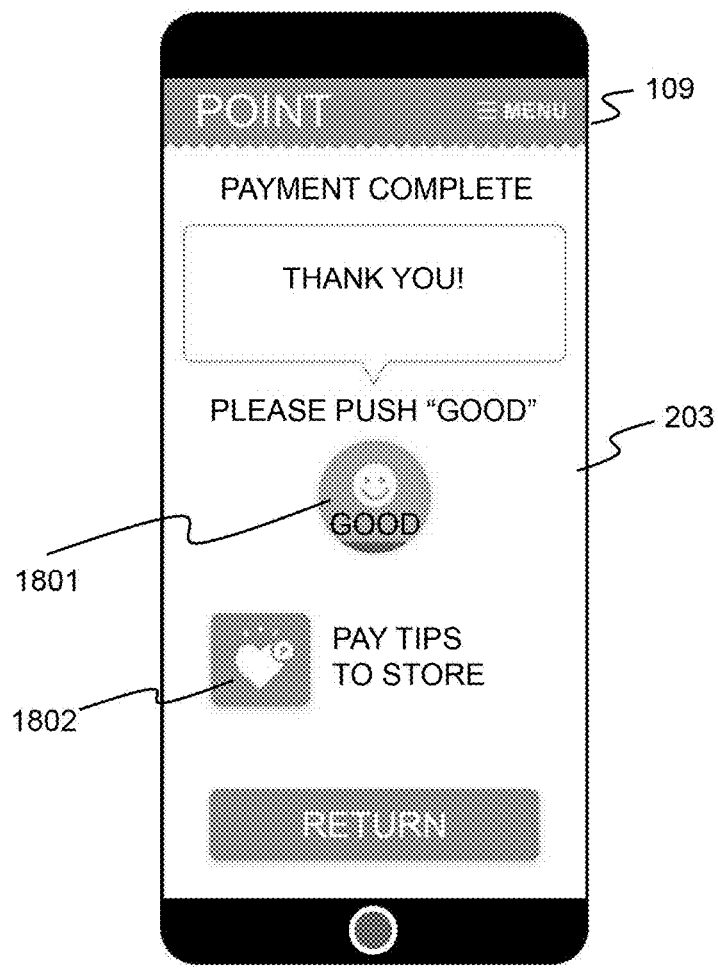
FIG. 18 illustrates an example of a settlement completion notice displayed on the mobile terminal (a settlement completion notice of settlement with points)

Incidentally, the ticket amount is adopted as the currency amount in the explanation of the payment processing with reference to FIG. 21 to FIG. 27; however, a point amount may be adopted instead of or in addition to the ticket amount. For example, when the payment processing using the point amount has been completed, the payment completion notice UI illustrated in FIG. 18 is displayed on the touch screen 203 of the mobile terminal 109 by the local currency application 211. Incidentally, the payment completion notice UI has a "LIKE" send button 1801 and a tip send button 1802 by which the user 107 shows their fondness for the service of the store 112 as gadgets for promoting interactions between the user 107 (for example, a local resident) and the store 112. The "LIKE" send button 1801 can show multiple levels of fondness by tapping it more than once or pressing and holding it down. Furthermore, tips are a specified point amount (for example, 50 points); however, the point amount as the tips may be any point amount arbitrarily decided by the user 107.

In this embodiment, the use of the local currency is promoted by the contrivance of the face-to-face settlement as described above. A local store 112 is generally of a small scale. So, it is difficult for the store 112 to extensively invest in equipment for the settlement of the local currency.

Furthermore, it is thought that the technology that induces active communication between the user 107 and the store staff member 108 for the promotion of the use of the local currency is desired.

In order to solve these problems, the mobile terminal 109 of the user 107 is used for the face-to-face settlement between the user 107 and the store staff member 108 in this embodiment. Consequently, it becomes unnecessary to extensively invest in equipment on the store 112 side and the opportunity to have communication between the user 107 and the store staff member 108 is provided. Then, since a certain period of time is required as the time to perform the touch operations simultaneously, active communication between the user 107 and the store staff member 108 is induced.

Incidentally, the settlement cannot be conducted with only the touch operation by the user 107 and the touch operation by the store staff member 108 is required for the settlement, so that it is impossible to complete the operation only by the user without the agreement of the store and it is thereby possible to prevent any unauthorized defrayment of the currency amount by bypassing the store who is a defrayer of the local currency.

Furthermore, the authentication information of the store 112 is used according to this embodiment. Consequently, if the two-dimensional bar code to be read for the settlement is replaced in an unauthorized manner in the environment where anybody who visits the store 112 at, for example, a store front of the store 112 can touch the relevant two-dimensional bar code, the settlement will fail. Therefore, it is possible to prevent any payment of the currency amount to a person not intended by the user 107 via the unauthorized two-dimensional bar code. Furthermore, the authentication information is the fingerprint information or the stamp information and is information acquired by the local currency application 211 through the touch operation of the store staff member 108. Since the store staff member 108 does not have to input the authentication information separately, this is highly convenient for the store staff member 108.

In this embodiment, for example, some variations as described below are possible.

One or more user-side UI's 2405 may be placed on the settlement UI (the payment UI or the charge UI). For example, the local currency application 211 may accept input of the number of persons on the user side and allocate the same number of the user-side UI's 2405 as, or the user-side UI's 2405 less than, the input number of persons may be placed on the settlement UI (the payment UI or the charge UI). In this case, it may be required for the completion of the settlement that all the user-side UI's 2405 or not less than some specified number of the user-side UI's 2405 should be simultaneously and continuously touched. Consequently, for example, when a plurality of persons visit the store, the plurality of persons can join and communicate with the store staff member 108.

One or more store-side UI's 2404 may be placed on the settlement UI. For example, if the local currency application 211 identifies a specified number of store staff members (for example, a sales person and their superior) from information indicating a designated sales object, the store-side UI's 2404 as many as the specified number of store staff members may be placed on the payment UI. It may be required for the completion of the settlement that all the store-side UI's 2404 or not less than some specified number of the user-side UI's 2404 should be simultaneously and continuously touched.

If at least either the user-side UI's 2405 or the store-side UI's 2404 are displayed in plurality, continuous and simultaneous touches of some certain proportion of the UI's may be adopted instead of the continuous and simultaneous touches of all the U I's.

In addition to the simultaneous touch operations by the user 107 and the store staff member 108, a conversation between the user 107 and the store staff member 108 may be also required for the completion of the settlement. The conversation may be detected by the local currency application 211 through the microphone 205 of the mobile terminal 109.

A period of time as a threshold value for the measured time (an example of the specified period of time) may not always be constant. For example, the local currency application 211 may determine the threshold value for the measured time based on various information which is input to the mobile terminal 109 via the interface apparatus 201, the camera 204, the microphone 205, and the touch screen 203.

Regarding the placement of the user-side UI 2405 and the store-side UI 2404, instead of placing them opposite each other (instead of placing the upper side for the user 107 on the opposite side of the upper side for the store staff member 108), the user-side UI 2405 and the store-side UI 2404 may be placed adjacent to each other (the uppers side for the user 107 and the upper side for the store staff member 108 may be the same).

Furthermore, as a method of reporting that the user-side UI 2405 and the store-side UI 2404 are touched simultaneously, a method other than the method of using the touch gauge 2403 to indicate the measured time during which the simultaneous touches are continued may be adopted. For example, while the simultaneous touches on the user-side UI 2405 and the store-side UI 2404 are continued, the local currency application 211 may cause the periphery of the user-side UI 2405 and the periphery of the store-side UI 2404 to flash on and off (for example, the outline of each of the UI 2405 and the UI 2404 may be displayed with glow). Consequently, the user 107 and the store staff member 108 can tell that the settlement is being processed. When the measured time has reached a certain period of time, the local currency application 211 may stop the flash display.

The above description can be summed up as followed.

The method for supporting promotion of use of the digital local currency is configured of: the local currency application 211 (an example of a first application program) executed at the mobile terminal 109 (an example of a user terminal); and the Web/AP server 102 (an example of a server) which communicates with the mobile terminal 109. As the local currency application 211 is executed by the mobile terminal 109, the following functions are implemented: function A that has the mobile terminal 109 accept designation of the currency amount of the digital local currency; function B that displays, on the touch screen 203, the settlement UI in which the user-side UI 2405 and the store-side UI 2404 are placed, as the settlement UI for the settlement of the currency amount; function C that judges whether time during which the touch operation on the user-side UI 2405 and the touch operation on the store-side UI 2404 are simultaneously continued has reached a specified period of time or not; function D that, if a result of the judgment is true, transmits a settlement request for the settlement of the above-designated currency amount to the Web/AP server 102; and function E that, upon receiving a settlement completion response from the Web/AP server 102, displays a settlement completion notice, which is a notice indicating that the settlement of the above-designated currency amount has been completed, on the touch screen 203. As a result, the store 112 which belongs to the local area can promote the use of the digital local currency without extensively investing in equipment for the settlement of the digital local currency. Incidentally, the number of the user-side UI's 2405 to be placed may be M (M is a natural number). The number of the store-side UI's 2404 to be placed may be N (N is a natural number). The number of the user-side UI's 2405 on which the touch operations are performed simultaneously may be X (X is a natural number equal to or less than M). The number of the store-side UI's 2404 on which the touch operations are performed simultaneously may be Y (Y is a natural number equal to or less than N).

The touch operation on the store-side UI 2404 also serves as input of authentication information of the store 112. Specifically speaking, for example, the touch operation on the store-side UI 2404 is to make a finger of the store staff member 108 touch the touch screen 203 and the authentication information is fingerprint information of the store staff member 108. Alternatively, the touch operation on the store-side UI 2404 is to make the contact site group 1505 of the store stamp 116, which is a unit having the contact site group 1505 configured of one or more contact sites 1506 which simultaneously contact the touch screen 203, contact the touch screen 203; and the contact site group 1505 has a feature specific to the store 112 and the authentication information is stamp information which is information representing the feature of the contact site group 1505. Consequently, the security for the settlement is enhanced as mentioned earlier; and as a result, the promotion of the use of the digital local currency can be expected also from the viewpoint of the enhancement of the security for the settlement in addition to inducement of communication.

The system for supporting promotion of use of the digital local currency further includes the settlement support application 311 (an example of a second application program) executed by the store tablet 111 (an example of a store terminal). When the settlement is to perform charging, the settlement support application 311 is executed by the store tablet 111, thereby implementing: function a that reads the two-dimensional bar code 1301 (an example of a first two-dimensional bar code), which represents the currency amount of the digital local currency printed on the store information card 110 (an example of a print medium), to the store tablet 111; and function b that transmits the charge information which indicates the currency amount represented by the read two-dimensional bar code 1301 and the store ID of the store 112 to the Web/AP server 102. The Web/AP server 102 generates the two-dimensional charge bar code 1701 (an example of a second two-dimensional bar code) which represents the charge token based on the currency amount and the store ID indicated by the charge information. The settlement support application 311 is executed by the store tablet 111, thereby further implementing function c that displays the generated two-dimensional charge bar code on the touch screen 303 of the store tablet 111. The local currency application 211 is executed by the mobile terminal 109, thereby implementing function F that reads the two-dimensional charge bar code 1701, which is displayed on the touch screen 303 of the store tablet 111, to the mobile terminal 109. If the result of the aforementioned judgment is true, function D transmits, besides the charge token represented by the read second two-dimensional bar code, a charge request for charging of the currency amount, which is associated with the user ID of the user and the authentication information of the store, to the Web/AP server 102. When receiving the charge request, the Web/AP server 102 judges whether or not the authentication information associated with the charge request matches the authentication information associated with the store ID. If the result of the judgment is true, the Web/AP server 102 adds a record including the currency amount and the store ID indicated by the charge token associated with the received charge request and the user ID associated with the relevant charge request to the transaction table 506 (an example of the transaction information to which an object representing the relevant settlement is added for each settlement of the currency amount of the digital local currency) and notifies the mobile terminal 109 of the completion of charging.

One embodiment and some variations have been described above; however, they have been illustrated as examples in order to explain the present disclosure and it is not intended to limit the scope of the present disclosure only to these embodiment and variations. The present disclosure can be implemented in various other aspects.

What is claimed is:

1. A method for supporting promotion of use of a digital local currency, comprising: accepting, by a user terminal including a touch screen, designation of a currency amount of the digital local currency;
   displaying, on the touch screen by the user terminal, a UI (User Interface) in which a user-side UI for accepting a touch operation by a user and a store-side UI for accepting a touch operation by a staff member of a store are placed, as a settlement UI for settlement of the currency amount, wherein the touch operation on the store-side UI also serves as input of authentication information of the store;
   judging, by the user terminal, whether time during which the touch operation on the user-side UI and the touch operation on the store-side UI are simultaneously continued has reached a specified period of time or not;
   transmitting, by the user terminal, a settlement request for settlement of the currency amount and the authentication information to a server if a result of the judgment is true; and
   displaying, by the user terminal, a settlement completion notice, which reports completion of the settlement of the currency if a settlement completion response to the settlement request is received from the server,
   wherein the touch operation on the store-side UI is to make a contact site group, which is composed of one or more contact sites to contact the touch screen at the same time, of a store stamp which is a unit including the contact site group, touch the touch screen,
   wherein the contact site group has a feature specific to the store, and
   wherein the authentication information is stamp information which is information representing the feature of the contact site group.

2. The method according to claim 1, wherein the touch operation on the store-side UI is to make a finger of the store staff member touch the touch screen; and wherein the authentication information is fingerprint information of the store staff member.

3. The method according to claim 1, wherein when the settlement is to perform charging,
   a store terminal including a touch screen reads a first two-dimensional bar code representing the currency amount of the digital local currency which is printed on a print medium;
   the store terminal transmits charge information representing the currency amount represented by the read first two-dimensional bar code and a store ID of the store to the server;
   the server generates a second two-dimensional bar code representing a charge token based on the currency amount and the store ID which are represented by the charge information;
   the store terminal displays the generated second two-dimensional bar code on the touch screen of the store terminal;
   the user terminal reads the second two-dimensional bar code displayed on the touch screen of the store terminal;
   if a result of the judgment is true, the user terminal transmits, besides the charge token represented by the read second two-dimensional bar code, a charge request for charging of the currency amount, which is associated with a user ID of the user and the authentication information of the store, to the server;
   upon receiving the charge request, the server judges whether or not the authentication information associated with the charge request matches the authentication information associated with the store ID; and
   if a result of the judgment is true, the server adds an object including the currency amount and the store ID, which are represented by the charge token associated with the received charge request, and the user ID associated with the charge request to transaction information that is information to which with respect to each settlement of the currency amount of the digital local currency an object representing the settlement is added, and notifies the user terminal of completion of the charging; and
   wherein the settlement completion notice is a charge completion notice which reports that the charging has been completed.

4. A system for supporting promotion of use of a digital local currency, comprising:
   a first application program executed at a user terminal including a touch screen; and
   a server that communicates with the user terminal,
   wherein the first application program:
   accepts designation of a currency amount of a digital local currency;
   displays, on the touch screen, a UI (User Interface) in which a user-side UI for accepting a touch operation by a user and a store-side UI for accepting a touch operation by a staff member of a store are placed, as a settlement UI for settlement of the currency amount, wherein the touch operation on the store-side UI also serves as input of authentication information of the store;
   judges whether time during which the touch operation on the user-side UI and the touch operation on the store-side UI are simultaneously continued has reached a specified period of time or not;
   transmits a settlement request for settlement of the currency amount and the authentication information to the server if a result of the judgment is true; and
   displays a settlement completion notice, which reports completion of the settlement of the currency if a settlement completion response is received from the server, wherein the touch operation on the store-side UI is to make a contact site group, which is composed of one or more contact sites to contact the touch screen at the same time, of a store stamp which is a unit including the contact site group, touch the touch screen, wherein the contact site group has a feature specific to the store, and wherein the authentication information is stamp information which is information representing the feature of the contact site group.

5. The system according to claim 4, wherein the touch operation on the store-side UI is to make a finger of the store staff member touch the touch screen; and wherein the authentication information is fingerprint information of the store staff member.

6. The method according to claim 4, further comprising a second application program executed at a store terminal including a touch screen, wherein when the settlement is to perform charging, the second application program:

reads a first two-dimensional bar code representing the currency amount of the digital local currency which is printed on a print medium; and transmits charge information representing the currency amount represented by the read first two-dimensional bar code and a store ID of the store to the server;

the server generates a second two-dimensional bar code representing a charge token based on the currency amount and the store ID which are represented by the charge information;

the second application program displays the generated second two-dimensional bar code on the touch screen of the store terminal;

the first application program reads the second two-dimensional bar code displayed on the touch screen of the store terminal;

if a result of the judgment is true, the first application program transmits, besides the charge token represented by the read second two-dimensional bar code, a charge request for charging of the currency amount, which is associated with a user ID of the user and the authentication information of the store, to the server;

upon receiving the charge request, the server judges whether or not the authentication information associated with the charge request matches the authentication information associated with the store ID; and if a result of the judgment is true, the server adds an object including the currency amount and the store ID, which are represented by the charge token associated with the received charge request, and the user ID associated with the charge request to transaction information that is information to which with respect to each settlement of the currency amount of the digital local currency an object representing the settlement is added, and notifies the user terminal of completion of the charging; and wherein the settlement completion notice is a charge completion notice which reports that the charging has been completed.

7. A non-transitory computer-readable medium storing contents that, when executed by a computer including a touch screen, cause the one or more computers to:

accept designation of a currency amount of a digital local currency;

display, on the touch screen, a UI (User Interface) in which a user-side UI for accepting a touch operation by a user and a store-side UI for accepting a touch operation by a staff member of a store are placed, as a settlement UI for settlement of the currency amount, wherein the touch operation on the store-side UI also serves as input of authentication information of the store;

judge whether time during which the touch operation on the user-side UI and the touch operation on the store-side UI are simultaneously continued has reached a specified period of time or not;

transmit a settlement request for settlement of the currency amount and the authentication information to a server if a result of the judgment is true; and display a settlement completion notice, which reports completion of the settlement of the currency if a result of the judgment is true, wherein the touch operation on the store-side UI is to make a contact site group, which is composed of one or more contact sites to contact the touch screen at the same time, of a store stamp which is a unit including the contact site group, touch the touch screen, wherein the contact site group has a feature specific to the store, and wherein the authentication information is stamp information which is information representing the feature of the contact site group.

8. The non-transitory computer-readable medium of claim 7, wherein the touch operation on the store-side UI is to make a finger of the store staff member touch the touch screen; and wherein the authentication information is fingerprint information of the store staff member.

* * * * *